(12) United States Patent
Terasawa et al.

(10) Patent No.: US 8,099,901 B2
(45) Date of Patent: Jan. 24, 2012

(54) CONTINUOUS ASSEMBLAGE OF POTS FOR RAISING AND TRANSPLANTING SEEDLINGS AND METHOD OF MANUFACTURING THE SAME

(75) Inventors: Hidekazu Terasawa, Obihiro (JP); Sumio Ito, Kamikawa-gun (JP); Keizo Yamazaki, Kamikawa-gun (JP); Masashi Tanimura, Kamikawa-gun (JP); Tetsuo Nanbu, Obihiro (JP); Yasunobu Kawamoto, Obihiro (JP)

(73) Assignee: Nippon Beet Sugar Mfg., Co., Ltd., Tokyo (JP)

( * ) Notice: Subject to any disclaimer, the term of this patent is extended or adjusted under 35 U.S.C. 154(b) by 0 days.

(21) Appl. No.: 12/929,734

(22) Filed: Feb. 11, 2011

(65) Prior Publication Data

US 2011/0131877 A1    Jun. 9, 2011

Related U.S. Application Data

(62) Division of application No. 11/794,266, filed as application No. PCT/JP2005/023774 on Dec. 26, 2005, now Pat. No. 7,937,892.

(30) Foreign Application Priority Data

Dec. 27, 2004 (JP) ................................. 2004-377906
Dec. 27, 2004 (JP) ................................. 2004-377907
Nov. 11, 2005 (JP) ................................. 2005-327315

(51) Int. Cl.
*A01G 9/10* (2006.01)
(52) U.S. Cl. ......................................................... 47/77
(58) Field of Classification Search ............. 47/77, 65.5, 47/66.1, 68, 66.3, 66.4, 73, 72, 86
See application file for complete search history.

(56) References Cited

U.S. PATENT DOCUMENTS 3,757,468 A * 9/1973 Shirouzu ........................... 47/85
(Continued)

FOREIGN PATENT DOCUMENTS

JP          A 51-141246         12/1976
(Continued)

OTHER PUBLICATIONS

Feb. 4, 2011 Office Action issued in U.S. Appl. No. 11/794,266.

*Primary Examiner* — Monica Williams
(74) *Attorney, Agent, or Firm* — Oliff & Berridge, PLC

(57) ABSTRACT

A continuous assemblage of pots for raising and transplanting seedlings and a method of manufacturing the assemblage is provided, in which it is possible to extend the length of a link piece without folding an extension portion or arranging a slit, thereby making it possible to handle enlargement of the interval between the planted seedlings stably and reliably. A link piece is formed by folding back both ends of a strip-shaped thin film in the length direction, such that approximately one-fourth of the length of the thin film is folded back onto the same face of the thin film at each end, then attaching the folded-back portions to the same face of the thin film with a water-soluble adhesive. The link pieces are disposed in two rows in a staggered arrangement in which the folded-back portions are oriented such that they face the folded-back portions of the opposing link pieces. Continuous pieces are formed by using a non-water-soluble adhesive to attach both ends in the length direction of each link piece to the opposing link pieces. Individual pots are formed between the opposing link pieces. Therefore, it is possible to extend the length of the link piece without folding an extension portion or arranging a slit, as in the conventional continuous assemblage of pots, thereby making it possible to handle enlargement of the interval between the planted seedlings stably and reliably.

10 Claims, 25 Drawing Sheets

U.S. PATENT DOCUMENTS

| | | | |
|---|---|---|---|
| 5,058,320 A | * 10/1991 | Tsuru et al. | 47/66.4 |
| 5,155,935 A | * 10/1992 | Tanimura et al. | 47/86 |
| 5,595,020 A | 1/1997 | Ito et al. | |
| 5,653,055 A | 8/1997 | Sunaga et al. | |

FOREIGN PATENT DOCUMENTS

| | | |
|---|---|---|
| JP | A 52-075555 | 6/1977 |
| JP | B2 58-011817 | 3/1983 |
| JP | A 05-308822 | 11/1993 |
| JP | A 07-123869 | 5/1995 |
| JP | A 08-205687 | 8/1996 |
| JP | A 08-266162 | 10/1996 |
| JP | A 10-164997 | 6/1998 |

* cited by examiner (A)

(B)

(C)

CONTINUOUS ASSEMBLAGE OF POTS FOR RAISING AND TRANSPLANTING SEEDLINGS AND METHOD OF MANUFACTURING THE SAME

This is a Division of application Ser. No. 11/794,266 filed Aug. 23, 2007, which in turn is a PCT National Stage of International Application No. PCT/JP2005/023774 filed Dec. 26, 2005. The disclosure of the prior applications is hereby incorporated by reference herein in its entirety.

TECHNICAL FIELD

The present invention relates to a continuous assemblage of pots for raising and transplanting seedlings of vegetables and flowers and a method of manufacturing the assemblage.

BACKGROUND ART

Conventionally, in a continuous assemblage of pots for raising and transplanting seedlings, individual square or hexagonal tubular pots are formed by expanding papers or paper-like thin films and linked by link pieces to form continuous piece. The continuous assemblage of pots for raising and transplanting seedlings is made by overlapping the continuous pieces and using a water-soluble adhesive to attach the overlapping continuous pieces to one another. (For example, refer Patent Document 1). This kind of continuous assemblage of pots for raising and transplanting seedlings is kept in a flattened state while in storage and expanded when in use, forming a honeycomb assembly of tightly grouped individual pots. Numbers of seedlings can be intensively cultivated, by filling the individual pots with cultivation soil and sowing the seeds. Also, in the continuous assemblage of pots for raising and transplanting seedlings, the water-soluble adhesive is degraded by watering while the seedlings are being raised, and after the seedlings have been raised for a specified number of days, the overlapping continuous pieces can be separated and pulled apart in sequence by pulling on one end. For example, as described in Patent Document 2, it is possible to plant the seedlings efficiently by using a simple planter that rests on the ground.

Incidentally, in the conventional continuous assemblage of (hexagonal tubular) pots as described above, because it is necessary to group the individual pots tightly, the length of a link piece is arranged as the same length as a side face of an individual pot. When the seedlings are planted continuously by using a simple planter as described in Patent Document 2, the space between a neighboring plant is restricted by the length of the link piece, so cases occur in which the interval between the planted seedlings is too short for the crop for which the seedlings are cultivated, so that the use of the continuous assemblage of pots for raising and transplanting seedlings must be abandoned.

Therefore, in Patent Document 3, for example, a continuous assemblage of pots is disclosed, in which an extension portion, that is longer than a side face of an individual pot is provided to a link piece. The extension portions are folded and attached to one another with a water-soluble adhesive, and either a front or a rear side of each extension portion is attached to a side face of each individual pot with a water-soluble adhesive. Also, in Patent Document 4, a continuous assemblage of pots is disclosed, in which slits of a predetermined length are provided to a link piece or to an individual pot, allowing the link pieces to be extended through the slits.

However, the continuous assemblage of (hexagonal tubular) pots that is disclosed in Patent Document 3 has a problem, in that, the water does not penetrate sufficiently thorough the folded portions of the extension portions of the link pieces, and the water-soluble adhesive is not degraded sufficiently while raising the seedlings, so that the folded portions of the link pieces do not stretch and separate smoothly during the raising, leading to dispersion in the lengths of the link pieces, that is, in the intervals between the planted seedlings. Another problem is that, not only must the extension portions of the link pieces be folded and attached to one another with the adhesive, but the folded portions must also be attached to the individual pots, complicating the manufacturing process and increasing the cost. Yet, another problem of the continuous assemblage of pots as disclosed in Patent Document 4, is that, when the individual pots are pulled apart in sequence for transplanting, stress of the pulling force is concentrated at the end of the slit portion, easily breaking the continuous assemblage of pots.

Patent Document 1: Japanese Patent Publication JP S58-11817
Patent Document 2: Japanese Patent Publication JP H05-308822
Patent Document 3: Japanese Patent Publication JP H08-205687
Patent Document 4: Japanese Patent Publication JP H07-123869

DISCLOSURE OF THE INVENTION

In consideration of these circumstances, it is an object of the present invention to provide a continuous assemblage of pots for raising and transplanting seedlings, as well as providing a method of manufacturing the assemblage, in which it is possible to extend the length of a link piece without folding an extension portion or inserting a slit, thereby making it possible to handle enlargement or change in the interval between the planted seedlings stably and reliably and to contribute to cost reduction.

To achieve the object, according to a first aspect, referred in Claim 1 of the present invention, in a continuous assemblage of pots for raising and transplanting seedlings, hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive between them. Each of the link pieces is formed by folding back both ends of a strip-shaped thin film in the length direction, such that approximately one-fourth of the length of the thin film is folded back onto the same face of the thin film at each end, then attaching the folded-back portions to the same face of the thin film with a water-soluble adhesive. The link pieces are disposed in a staggered arrangement in which the folded-back portions are oriented such that they face the folded-back portions of the opposing link pieces. The continuous pieces are formed by using a non-water-soluble adhesive to attach both ends in the length direction of each link piece to the opposing link pieces, and the individual pots are formed between the opposing link pieces.

To achieve the object, according to a second aspect, referred in Claim 2 of the present invention, in a continuous assemblage of pots for raising and transplanting seedlings, hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive between them. Each of the link pieces is formed by folding back one end of a strip-shaped thin film in the length direction, such that approximately one-third of the length of the thin film is folded back, then attaching the folded-back portion to the thin film with a water-soluble adhesive. The link pieces are disposed in a staggered arrangement in which the folded-back portions are oriented such that they face the folded-back portions of the opposing link pieces. The continuous pieces are formed by using a non-water-soluble adhesive to attach both ends in the length direction of each link piece to the opposing link pieces, and the individual pots are formed between the opposing link pieces.

To achieve the object, according to a third aspect, referred in Claim 3 of the present invention, in a continuous assemblage of pots for raising and transplanting seedlings, square or hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive between them. The link pieces and the individual pots are independently formed from strip-shaped thin films. The link pieces are disposed in a staggered arrangement in alternation with and on both sides of the individual pots, which are arranged in a row. Both ends of each link piece are attached to side faces of the adjacent individual pots with a non-water-soluble adhesive, and one side of each link piece is attached to the corresponding side face of the individual pot with a water-soluble adhesive.

According to a fourth aspect of the present invention, in the continuous assemblage of pots for raising and transplanting seedlings, referred in Claim 3 of the present invention, the individual pots have a hexagonal tubular shape; and the link pieces have a length that is from one to seven times (but not the same as) the length of one side face of the individual pots.

According to a fifth aspect of the present invention, in the continuous assemblage of pots for raising and transplanting seedlings, referred in Claim 3 of the present invention, the individual pots have a square tubular shape, and the link pieces have a length that is from one to five times (but not the same as) the length of one side face of the individual pots.

To achieve the object, according to a sixth aspect of the present invention, in a continuous assemblage of pots for raising and transplanting seedlings, square or hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive between them. The individual pots are formed by attaching two thin films. Extension pieces of the thin films, which are provided on both sides of the individual pots, are folded back along side faces of the individual pots and are attached to the side faces using a water-soluble adhesive. The link pieces are formed by using a non-water-soluble adhesive to attach ends of the extension pieces to one another between the adjacent individual pots.

To achieve the object, according to a seventh aspect of the present invention, in a continuous assemblage of pots for raising and transplanting seedlings, square or hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive between them. The individual pots are formed by attaching two thin films. Extension pieces of the thin films, which are provided on both sides of half of the individual pots, are folded back along side faces of the individual pots and are attached to the side faces using a water-soluble adhesive. The link pieces are formed by using a non-water-soluble adhesive to attach ends of the extension pieces to the individual pots that do not have the extension pieces and that are arranged adjacent to the individual pots.

According to an eighth aspect of the present invention, in the continuous assemblage of pots for raising and transplanting seedlings according to the first to seventh aspects, perforations are formed in the individual pots in the position corresponding to the edge of the square tubes or the hexagonal tubes that are formed by expanding the individual pots.

To achieve the object, according to a ninth aspect of the present invention, a method of manufacturing the continuous assemblage of pots for raising and transplanting seedlings according to the first aspect includes a first process that applies the water-soluble adhesive to one face of the strip-shaped thin film and forms the link piece by folding back both ends of the strip-shaped thin film in the length direction, such that approximately one-fourth of the length of the thin film is folded back at each end, then attaching the folded-back portions to the thin film; a second process that disposes the link pieces in the staggered arrangement, in which the folded-back portions are oriented such that they face the folded-back portions of the opposing link pieces, and forms the continuous pieces and the individual pots by using the non-water-soluble adhesive to attach both ends in the length direction of each link piece to the opposing link pieces; and a third process that overlaps the continuous pieces and attaches them to one another with a water-soluble adhesive.

To achieve the object, according to a tenth aspect of the present invention, a method of manufacturing the continuous assemblage of pots for raising and transplanting seedlings according to the second aspect includes a first process that applies the water-soluble adhesive to one face of the strip-shaped thin film and forms the link piece by folding back one end of the strip-shaped thin film in the length direction, such that approximately one-third of the length of the thin film is folded back, then attaching the folded-back portion to the thin film; a second process that disposes the link pieces in the staggered arrangement, in which the folded-back portions are oriented such that they face the folded-back portions of the opposing link pieces, and forms the continuous pieces and the individual pots by using the non-water-soluble adhesive to attach both ends in the length direction of each link piece to the opposing link pieces; and a third process that overlaps the continuous pieces and attaches them to one another with a water-soluble adhesive.

To achieve the object, according to an eleventh aspect of the present invention, a method of manufacturing the continuous assemblage of pots for raising and transplanting seedlings according to the third to fifth aspects includes a first process that attaches both ends of the strip-shaped thin film by a non-water-soluble adhesive to form the tubular individual pots; a second process that disposes the link pieces in the staggered arrangement in alternation with and on both sides of a specified number of the individual pots, which are arranged in a row, attaches both ends of each link piece to the corresponding side faces of the adjacent individual pots with a non-water-soluble adhesive, and forms the continuous piece by attaching one side of each link piece to the side face of the individual pot with a water-soluble adhesive; and a third process that overlaps the continuous pieces and attaches them to one another with a water-soluble adhesive.

To achieve the object, according to a twelfth aspect of the present invention, a method of manufacturing the continuous assemblage of pots for raising and transplanting seedlings according to the sixth aspect includes a first process that attaches the two strip-shaped thin films and forms the individual pots, which have the extension pieces on both sides; a second process that folds back the extension pieces along the side faces of the individual pots and attaches the extension pieces to the side faces of the individual pots using the water-soluble adhesive; a third process that produces the continuous pieces by disposing the individual pots in a row, then forming the link pieces by using the non-water-soluble adhesive to attach the ends of the extension pieces to one another between the adjacent individual pots; and a fourth process that overlaps the continuous pieces and attaches them to one another with a water-soluble adhesive.

To achieve the object, according to a thirteenth aspect of the present invention, a method of manufacturing the continuous assemblage of pots for raising and transplanting seedlings according to the seventh aspect includes a first process that attaches the two strip-shaped thin films and forms the first individual pots, which have the extension pieces on both sides, the second individual pots, which do not have the extension pieces on both sides; a second process that folds back the extension pieces along the side faces of the first individual pots and attaches the extension pieces to the side faces of the first individual pots using the water-soluble adhesive; a third process that produces the continuous pieces by disposing the first individual pots and the second individual pots in a row, then forming the link pieces by attaching the ends of the extension pieces on the first individual pots to the second individual pots; and a fourth process that overlaps the continuous pieces and attaches them to one another with a water-soluble adhesive.

According to a fourteenth aspect of the present invention, the methods of manufacturing the continuous assemblage of pots for raising and transplanting seedlings according to the ninth to thirteenth aspects include a perforation processing process that forms perforations in the individual pots to a line corresponding to the edge of the square tubes or the hexagonal tubes that are formed by expanding the individual pots.

Therefore, according to the first, second, third, sixth, and seventh aspects of the present invention, the water-soluble adhesive becomes sufficiently degraded by watering during the raising of the seedlings for the link pieces to separate and expand smoothly during transplanting. It is also possible to extend the planting intervals between the individual pots (the intervals between the planted seedlings) to seven times the length of one side face of the individual pots (according to the first and sixth aspects of the present invention), to four times the length of one side face of the individual pots (according to the second and (hexagonal tubular) seventh aspects of the present invention), and to five times the length of one side face of the individual pots (according to the fifth and (square tubular) seventh aspects of the present invention).

According to the fourth and fifth aspects of the present invention, the selecting of appropriate attachment positions (for attachment by the non-water-soluble adhesive) where both ends of each link piece are attached to the side faces of the adjacent individual pots makes it possible to vary freely the lengths of the link pieces within a range of one to seven times the length of one side of the individual pot (according to the fourth aspect of the present invention) when the hexagonal tubular individual pots are grouped and to vary freely the lengths of the link pieces within a range of one to five times the length of one side of the individual pot (according to the fifth aspect of the present invention) when the square tubular individual pots are grouped.

According to the eighth and fourteenth aspects of the present invention, the force that is required when the continuous assemblage of pots is expanded is reduced.

According to the ninth to thirteenth aspects of the present invention, a process to fold an extension portion into a plurality of layers and a process to arrange a slit, as in the conventional continuous assemblage of pots, are eliminated, so the manufacturing process can be simplified.

It is thus possible to provide a continuous assemblage of pots for raising and transplanting seedlings, as well as a method of manufacturing the assemblage, in which it is possible to extend the length of a link piece without folding an extension portion or arranging a slit, thereby making it possible to respond stably and reliably to enlargement or change in the interval between the planted seedlings and to contribute to cost reduction.

DETAILED DESCRIPTION OF EMBODIMENTS

Description of the Reference Numerals

First Embodiment, Second Embodiment 1, 11 ... CONTINUOUS ASSEMBLAGE OF POTS
2, 12 ... INDIVIDUAL POT
3, 13 ... LINK PIECE
6, 16 ... FOLDED-BACK PORTION
7, 17 ... ATTACHMENT PORTION
8, 18 ... CONTINUOUS PIECE
9, 19 ... CONNECTING PORTION
21 ... OTHER END PORTION (LINK PIECE 13)
22 ... PERFORATIONS Third Embodiment 41, 51 ... CONTINUOUS ASSEMBLAGE OF POTS
42, 52 ... INDIVIDUAL POT
43, 53 ... LINK PIECE
44, 54 ... CONTINUOUS PIECE
46, 56 ... ATTACHMENT PORTION OF INDIVIDUAL POT
47, 57 ... ATTACHMENT PORTION OF LINK PIECE Fourth Embodiment, Fifth Embodiment 81, 121 ... CONTINUOUS ASSEMBLAGE OF POTS
82, 112, 122 ... INDIVIDUAL POT
83, 123 ... LINK PIECE
84, 124 ... CONTINUOUS PIECE
85 (85A, 85B), 120 (120A, 120B) ... THIN FILM
86, 125 ... ATTACHMENT PORTION OF INDIVIDUAL POT
87 (87A, 87B), 126 (126A, 126B) ... EXTENSION PIECE
88, 127 ... ATTACHMENT PORTION OF EXTENSION PIECE

BEST MODES FOR CARRYING OUT THE INVENTION

The best modes for carrying out the present invention will now be explained with reference to the attached drawings.

Figure 1:
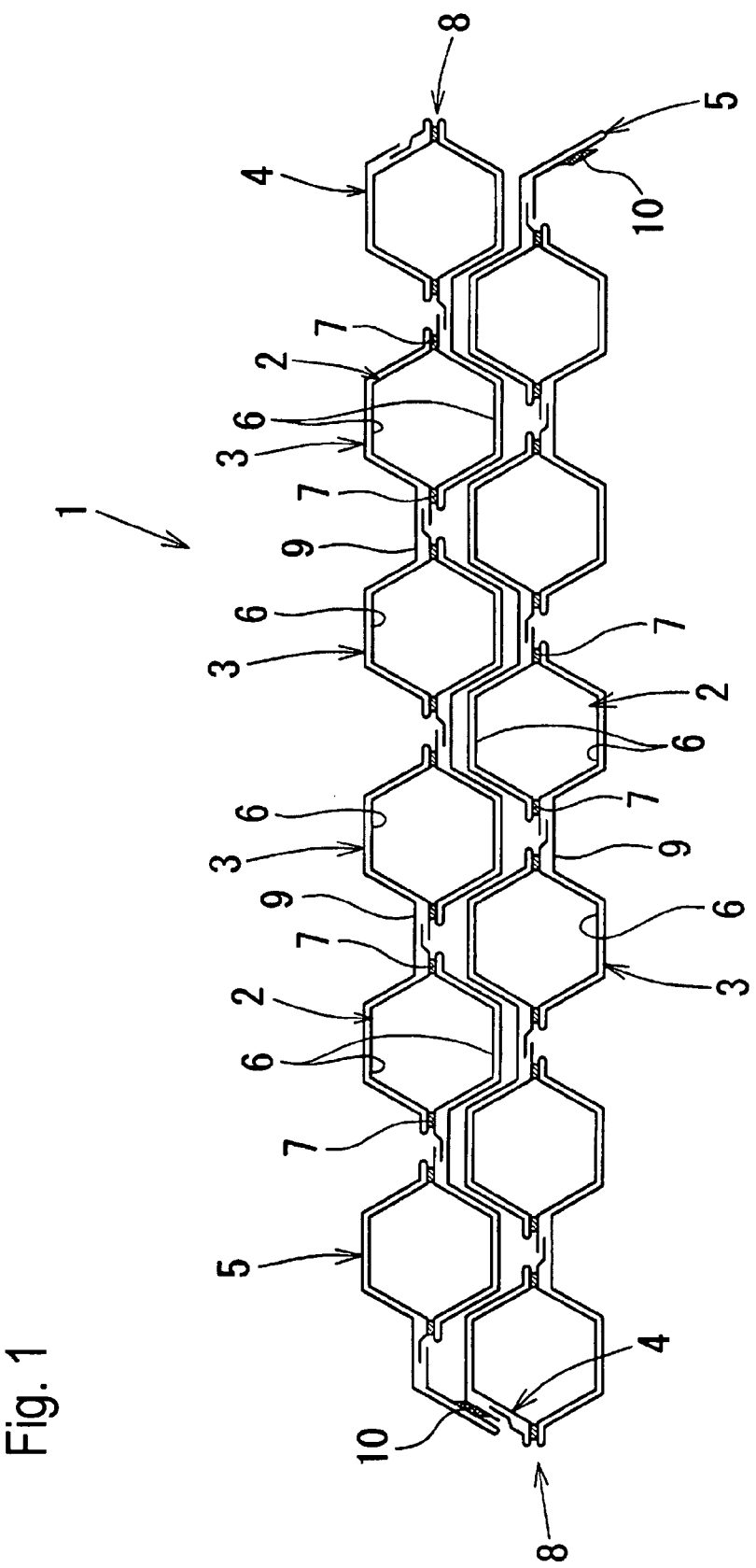
FIG. 1 is a plan view that schematically shows a structure of a continuous assemblage of pots for raising and transplanting seedlings according to the first embodiment of the present invention.
Figure 2:
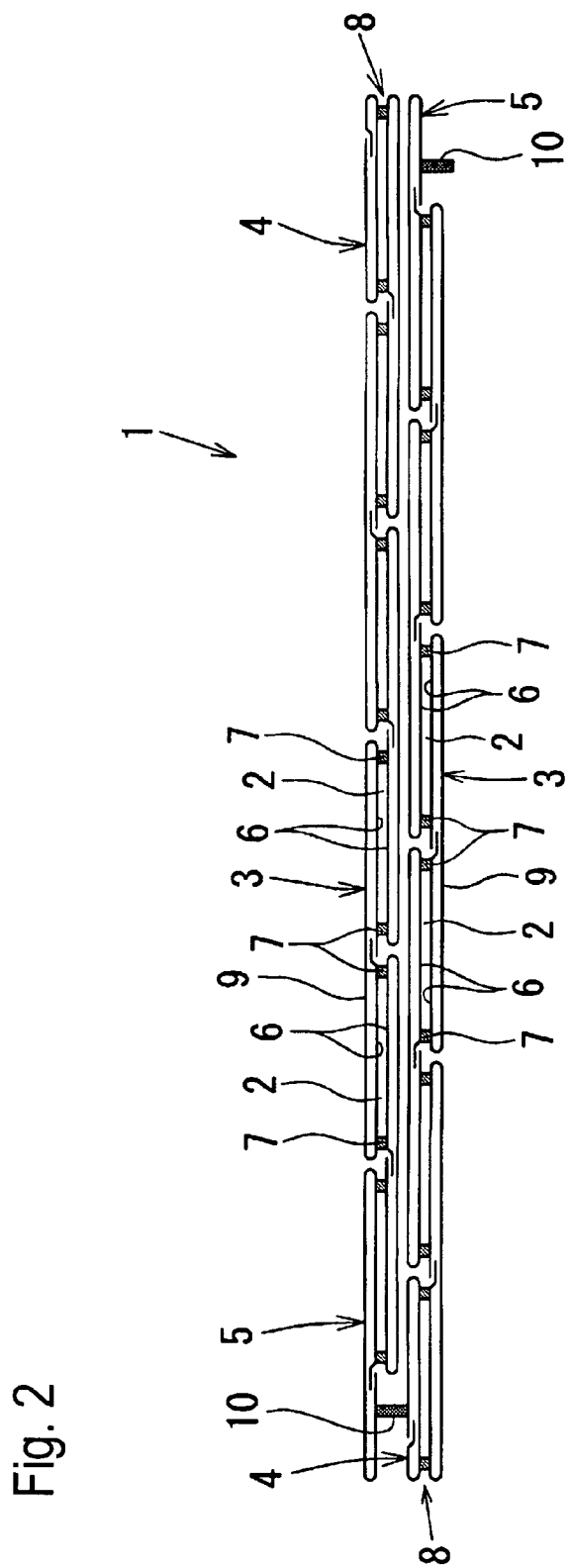
FIG. 2 is a schematic drawing that shows a flattened state of the continuous assemblage of pots for raising and transplanting seedlings as shown in FIG. 1.

A first embodiment of the present invention will be explained with reference to FIGS. 1 and 2. As shown in FIGS. 1 and 2, a continuous assemblage of pots for raising and transplanting seedlings (hereinafter called, the continuous assemblage of pots 1) is formed by grouping a plurality of individual hexagonal tubular pot 2, and each individual pot 2 is made up of a link piece 3 and a folded-over pieces 4, 5. Here, the link piece 3 is formed into a tubular shape by folding back both ends of a strip-shaped thin film in the length direction (the left-right direction in FIG. 2), such that approximately one-fourth of the length of the thin film is folded back onto the same face of the thin film at each end, then using a water-soluble adhesive to attach the inner faces of the link piece 3. Also, in the continuous assemblage of pots 1, a series of continuous pieces 8 is formed. Each continuous piece 8 is formed by arranging a specified number of the link pieces 3 in two rows, with each link piece 3 offset from the opposing link pieces 3 by one-half pitch (one pitch being an interval that is nearly equal to the total length of one link piece 3), and with the folded-back portions 6 of each link piece 3 oriented such that they face the folded-back portions 6 of the opposing link pieces 3, then using a non-water-soluble adhesive to attach both ends of each link piece 3 to the opposing link pieces 3 (at attachment portions 7). Also, the continuous assemblage of pots 1, which tightly groups the individual pots 2, is formed by overlapping a plurality of the continuous pieces 8, attaching them to one another using a water-soluble adhesive. Note that in FIGS. 1 and 2, the gaps between (the folded-back portions 6 of) the link pieces 3 and the folded-over pieces 4, 5, as well as the gaps between the continuous pieces 8, are shown as open, but actually, a water-soluble adhesive that is not shown in the drawings is interposed in the gaps.

As shown in FIG. 2, in the continuous assemblage of pots 1, non-attached portions that are formed between the attachment portions 7 that join the opposing folded-back portions 6 of the link pieces 3 are provided as individual pots 2. The non-attached portions (individual pots 2) are connected, with the intervals therebetween equal to the length of one side of the individual pot 2 (one side of the hexagonal shape shown in FIG. 1). On the other hand, the link piece 3 is formed by folding back both ends of the strip-shaped thin film in the length direction, such that approximately one-fourth of the total length of the thin film is folded back at each end, then overlapping the ends of the folded-back portions 6 in the center of the link piece 3. The link pieces 3 are arranged such that the overlapped portions face one another and are offset (by one-half pitch). Also, the link piece 3 is pressed flat such that its length is approximately seven times the length of one side of the individual pot 2. A segment of the link piece 3 that does not have an overlapping portion is provided, as shown in FIG. 3, to function as a connecting portion 9 (connecting piece) during planting, as described below.

The continuous piece 8, as described above, is formed by attaching the link pieces 3 in a staggered arrangement. The continuous assemblage of pots 1 is formed by overlapping a specified number of the continuous pieces 8, with adjacent continuous pieces 8 rotated 180 degrees (inverted) relative to one another. In this case, as shown in FIGS. 1 and 2, the folded-over pieces 4, 5, whose lengths are shorter than the lengths of the link pieces 3, are positioned at opposite ends of the continuous piece 8. In the first embodiment, each of the folded-over pieces 4, 5 is formed by folding back both ends of a strip-shaped thin film in the length direction (the left-right direction in FIG. 2). The length of the folded-over piece 4 is set to be approximately three times the length of one side of the individual pot 2, and the length of the folded-over piece 5 is set to be approximately five times the length of one side of the individual pot 2. Also, in the continuous assemblage of pots 1, the folded-over pieces 4, 5 thus formed are positioned at opposite ends of the continuous pieces 8 and form the individual pots 2 by being attached to the link pieces 3. The continuous pieces 8 are overlapped and connected by using attachment portions 10, which are made up of a non-water-soluble adhesive, to connect the folded-over pieces 4, 5 at both ends of the continuous pieces 8.

The continuous assemblage of pots 1 that is structured in this way is provided and stored in a flattened state, as shown in FIG. 2. Starting from the flattened state, the continuous pieces 8 are pulled open in the layering direction, expanding into a plurality of the individual pots 2 in a honeycomb pattern, as shown in FIG. 1, and forming the continuous assemblage of pots 1 of a specified size. When the seedlings are raised, the continuous assemblage of pots 1, in the expanded state, is set into a cultivation box, each individual pot 2 is filled with a cultivation soil, and the seeds are sown. After the seedlings have been raised for a specified number of days, the water-soluble adhesive on the inner faces of the link pieces 3 and the folded-over pieces 4, 5 and the water-soluble adhesive between the continuous pieces 8 become degraded by the watering during the raising of the seedlings. Therefore, in the continuous assemblage of pots 1, during transplanting after the seedlings are raised, when one end of the continuous piece 8 is pulled, as shown in FIG. 3, the continuous pieces 8 are pulled out in sequence, such that efficient planting is possible. In this case, as described above, the length of the connecting portion 9 (connecting piece) becomes approximately seven times the length of one side of the individual pot 2, so the continuous assemblage of pots 1 can effectively handle the cultivation of a crop that requires a wide interval between the planted seedlings.

Figure 3:
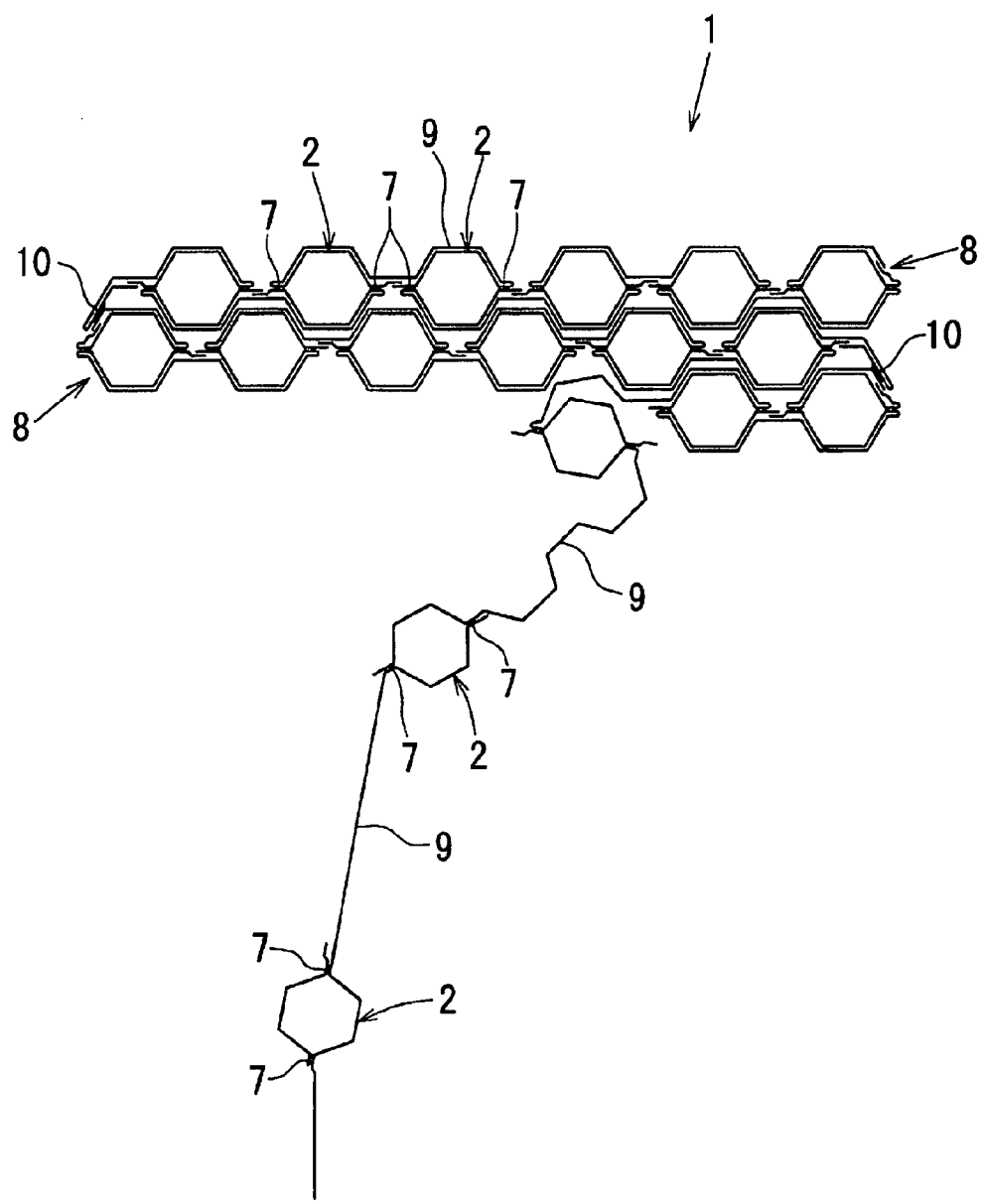
FIG. 3 is a schematic drawing that shows a pulled-apart state of the continuous assemblage of pots for raising and transplanting seedlings as shown in FIG. 1.

Also, in the continuous assemblage of pots 1, as shown in FIG. 3, during transplanting, conditions are created in which tensile force acts on the connecting portions 9 (connecting pieces) between the connected individual pots 2. Under these conditions, sufficient strength can be ensured, because the attached faces of the attachment portions 7 and the attachment portions 10 are parallel to the direction in which the individual pots 2 are pulled out. Thus, during transplanting, the attachment portions 7 and the attachment portions 10 are not torn, and the individual pots 2 are pulled out stably.

Note that in the first embodiment, the link piece 3 is formed by overlapping both ends of the folded-back portions 6 of the strip-shaped thin film, but of course, the link piece 3 may be formed by butting both ends of the folded-back portions 6 together, or by attaching both of the folded-back portions 6 with a gap between their ends, as long as the gap does not exceed one-third of the length of one side of the individual pot 2.

Figure 4:
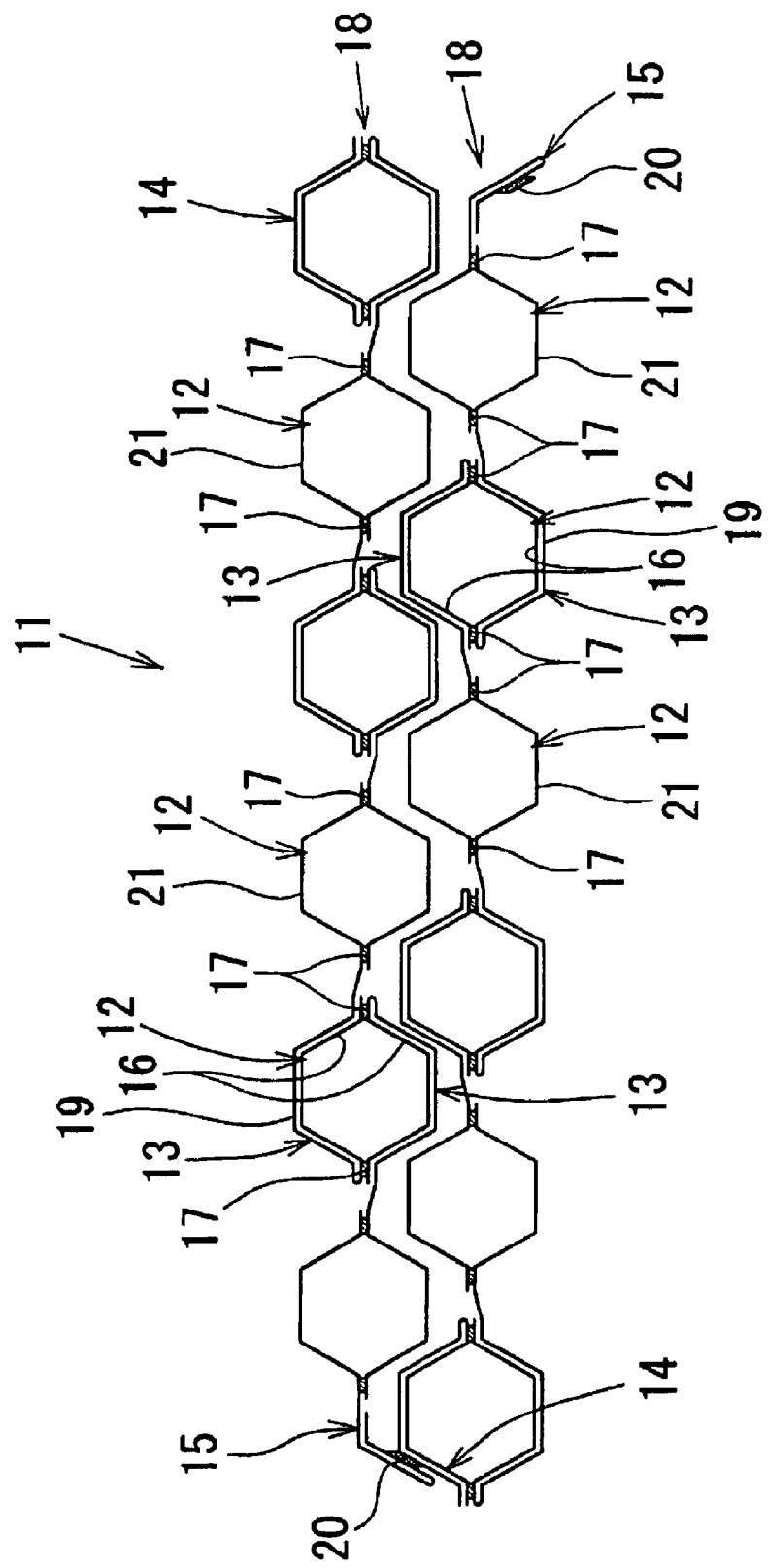
FIG. 4 is a plan view that schematically shows a structure of a continuous assemblage of pots for raising and transplanting seedlings according to the second embodiment of the present invention.
Figure 5:
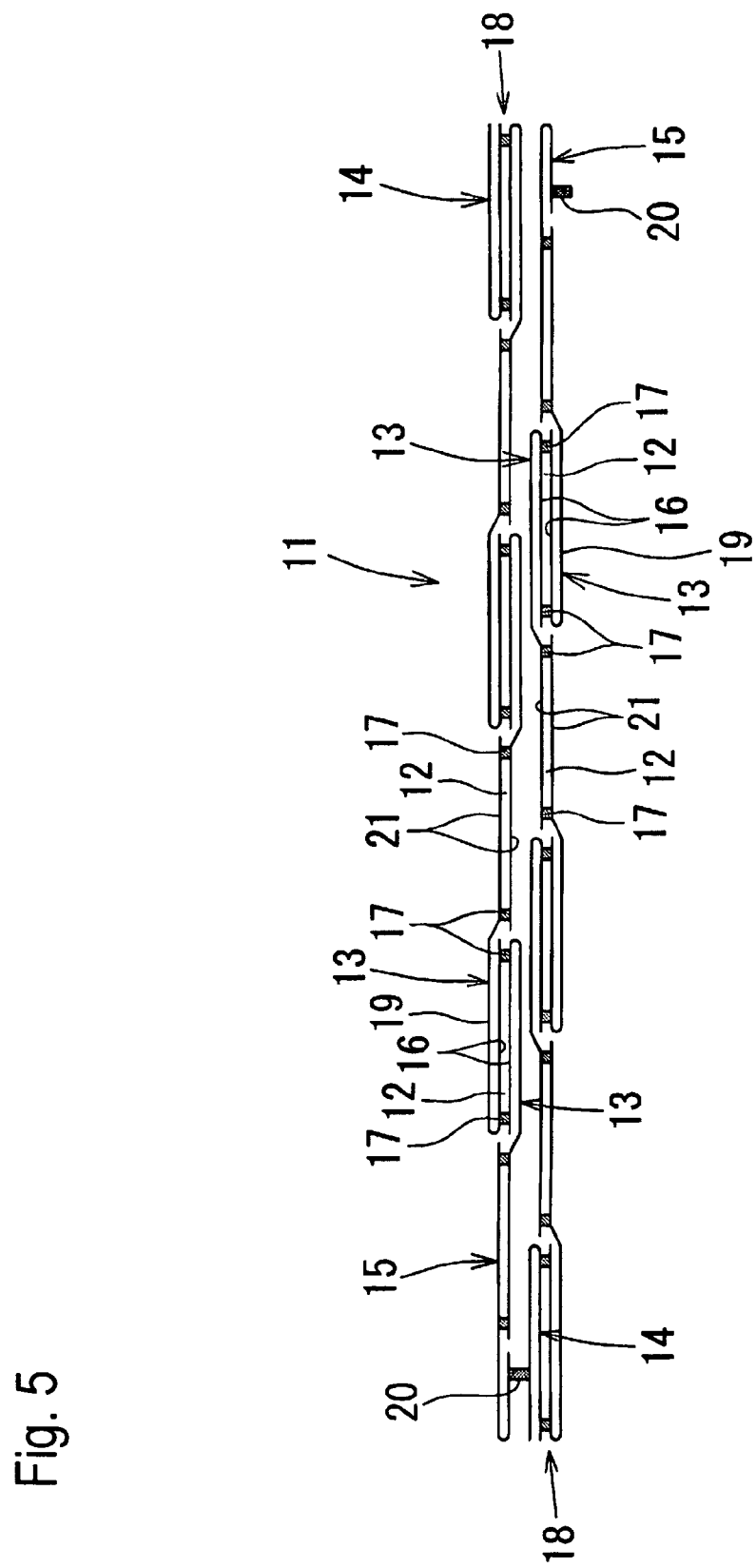
FIG. 5 is a schematic drawing that shows a flattened state of the continuous assemblage of pots for raising and transplanting seedlings as shown in FIG. 4.

Next, a second embodiment of the present invention will be explained based on FIGS. 4 to 6. As shown in FIGS. 4 and 5, a continuous assemblage of pots for raising and transplanting seedlings 11 (hereinafter called the continuous assemblage of pots 11) groups individual hexagonal tubular pots 12, and each individual pot 12 is made up of a link piece 13 and folded-over pieces 14, 15. Here, the link piece 13 is formed by folding back one end of a strip-shaped thin film in the length direction (the left-right direction in FIG. 5), such that approximately one-third of the length of the thin film is folded back at each end, then using a water-soluble adhesive to attach the folded-back portion 16. Also, in the continuous assemblage of pots 11, a series of continuous pieces 18 is formed. Each continuous piece 18 is formed by arranging a specified number of the link pieces 13 in two rows, with each link piece 13 offset from the opposing link pieces 13 by one-half pitch (one pitch being an interval that is nearly equal to the total length of one link piece 13), and with the folded-back portion 16 of each link piece 13 oriented such that it faces the folded-back portion 16 of the opposing link piece 13, then using a non-water-soluble adhesive to attach both ends of each link piece 13 to the opposing link pieces 13 (at attachment portions 17). Also, the continuous assemblage of pots 11, which tightly groups the individual pots 12, is formed by overlapping a plurality of the continuous pieces 18, attaching them to one another using a water-soluble adhesive. Note that in FIGS. 4 and 5, the gaps between (the folded-back portions 16 of) the link pieces 13 and the folded-over pieces 14, 15, as well as the gaps between the continuous pieces 18, are shown as open, but actually, a water-soluble adhesive that is not shown in the drawings is interposed in the gaps.

As shown in FIG. 5, in the continuous assemblage of pots 11, non-attached portions that are formed between the attachment portions 17, which join the opposing folded-back portions 16 of the link pieces 13 and join other end portions 21 (other end portions of the strip-shaped thin films) of the link pieces 13, to which the folded-back portions 16 are not attached, are provided as individual pots 12. The non-attached portions (individual pots 12) are connected, with the intervals between them equal to the length of one side of the individual pot 12 (one side of the hexagonal shape shown in FIG. 4). On the other hand, the link piece 13 is formed by folding back one end of the strip-shaped thin film in the length direction, such that approximately one-third of the total length of the thin film is folded back. The link pieces 13 are arranged such that the folded-back portion 16 of each link piece 13 faces the folded-back portion 16 of an opposing link piece 13, the other end portion 21 of each link piece 13 faces the other end portion 21 of an opposing link piece 13, and the opposing link pieces 13 are offset (by one-half pitch). Also, the link piece 13 is pressed flat such that its length is approximately seven times the length of one side of the individual pot 12. A segment of the link piece 13 to which the folded-back portion 16 is not attached is provided, as shown in FIG. 6, to function as a connecting portion 19 (connecting piece) during planting, as described later.

The continuous piece 18, as described above, is formed by attaching the link pieces 13 in a staggered arrangement. The continuous assemblage of pots 11 is formed by overlapping a specified number of the continuous pieces 18, with adjacent continuous pieces 18 rotated 180 degrees (inverted) relative to one another. In this case, as shown in FIGS. 4 and 5, the folded-over pieces 14, 15, whose lengths are shorter than the lengths of the link pieces 13, are positioned at opposite ends of the continuous piece 18. In the second embodiment, each of the folded-over pieces 14, 15 is formed by folding back one end of a strip-shaped thin film in the length direction (the left-right direction in FIG. 5). The length of the folded-over piece 14 is set to be approximately three times the length of one side of the individual pot 12, and the length of the folded-over piece 15 is set to be approximately five times the length of one side of the individual pot 12. Also, in the continuous assemblage of pots 11, the folded-over pieces 14, 15 thus formed are positioned at opposite ends of the continuous pieces 18 and form the individual pots 12 by being attached to the link pieces 13. The continuous pieces 18 are connected by using attachment portions 20, which are made up of a non-water-soluble adhesive, to attach the folded-over pieces 14, 15 to one another at both ends of the continuous pieces 18.

The continuous assemblage of pots 11 that is structured in this way is provided and stored in a flattened state, as shown in FIG. 5. Starting from the flattened state, the continuous pieces 18 are pulled open in the layering direction, expanding into a plurality of the individual pots 12 in a honeycomb pattern, as shown in FIG. 4, and forming the continuous assemblage of pots 11 of a specified size. When the seedlings are raised, the continuous assemblage of pots 11, in the expanded state, is set into a cultivation box, each individual pot 12 is filled with a cultivation soil, and the seeds are sown. After the seedlings have been raised for a specified number of days, the water-soluble adhesive on the folded-back faces of the link pieces 13 and the folded-over pieces 14, 15 and the water-soluble adhesive between the continuous pieces 18 become degraded by the watering during the raising of the seedlings. Therefore, in the continuous assemblage of pots 11, during transplanting after the seedlings are raised, when one end of the continuous piece 18 is pulled, as shown in FIG. 6, the continuous pieces 18 are pulled out in sequence, such that efficient planting is possible. In this case, as described above, the length of the connecting portion 19 (connecting piece) becomes approximately four times the length of one side of the individual pot 12, so the continuous assemblage of pots 11 can effectively handle the cultivation of a crop that requires a somewhat wide interval between the planted seedlings.

Figure 6:
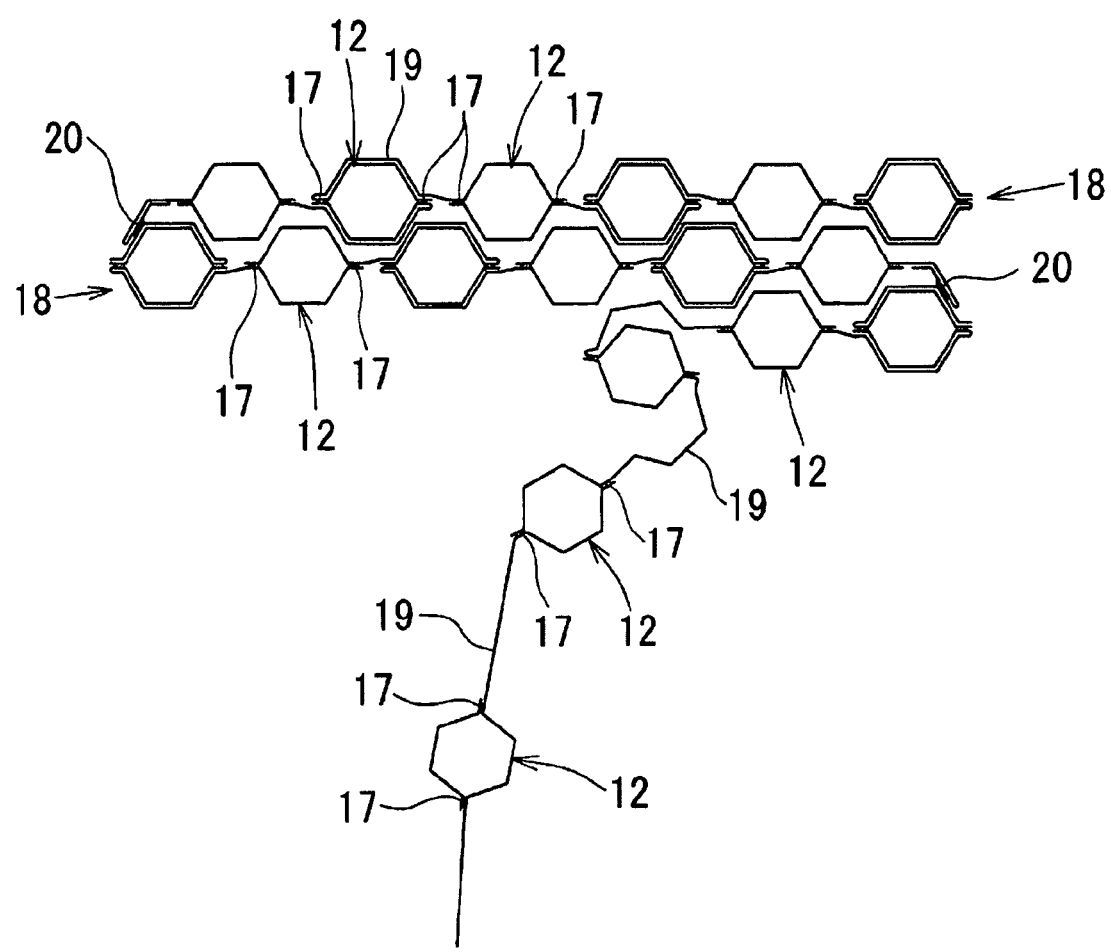
FIG. 6 is a schematic drawing that shows a pulled-apart state of the continuous assemblage of pots for raising and transplanting seedlings shown as in FIG. 4.

Also, in the continuous assemblage of pots 11, as shown in FIG. 6, during transplanting, conditions are created in which tensile force acts on the connecting portions 19 (connecting pieces) between the connected individual pots 12. Under these conditions, sufficient strength can be ensured, because the attached faces of the attachment portions 17 and the attachment portions 20 are parallel to the direction in which the individual pots 12 are pulled out. Thus, during transplanting, the attachment portions 17 and the attachment portions 20 are not torn, and the individual pots 12 are pulled out stably.

Here, any type of material may be used for the thin film, but a material should be selected that resists rotting at least through the period when the seedlings are being raised. Generally, the period when the seedlings are being raised is around forty days; however, in certain seedlings; such as, Welsh onions or onions, the period may be forty to ninety days or longer. Types of material that are rot-resistant for around forty days include, for example, a plant fiber paper that is coated or mixed with an anti-rot agent or an anti-bacterial agent, a synthetic fiber paper in which synthetic fiber is mixed with natural pulp, and the like. Types of material that are rot-resistant for forty to ninety days or longer include a rot-resistant paper whose wet strength has been increased by treating a mixed synthetic fiber paper with a chemical, a non-corrosive, non-woven sheet, a paper in which natural pulp has been treated with a chemical, a paper in which a mixed synthetic fiber paper has been treated with a rot-resistant chemical, such as an anti-bacterial agent or the like, and the like.

Also, any type of adhesive may be used, but for example, for the water-soluble adhesive, a synthetic chemical adhesive, such as polyvinyl alcohol, polyacrylate, polyethylene oxide, or the like, or a natural adhesive, such as gum arabic, starch gum, carboxymethyl cellulose, or the like, can be used. Also, for example, for the non-water-soluble adhesive, a synthetic chemical adhesive, such as a vinyl polyacetate emulsion, an epoxy resin emulsion, a hot melt adhesive, or the like, can be used.

Figure 7:
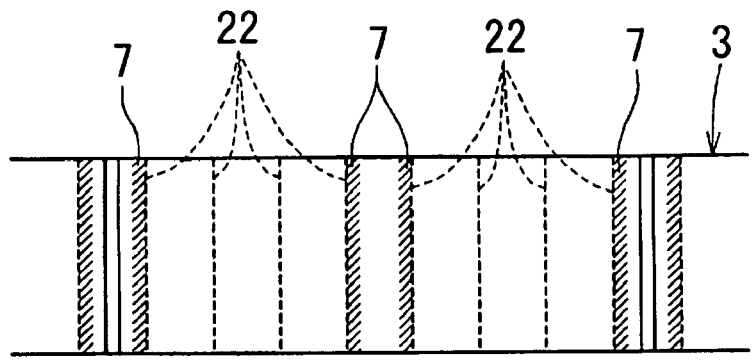
FIG. 7 is a schematic drawing that shows a shape of a perforation in a continuous assemblage of pots for raising and transplanting seedlings.
Figure 8:
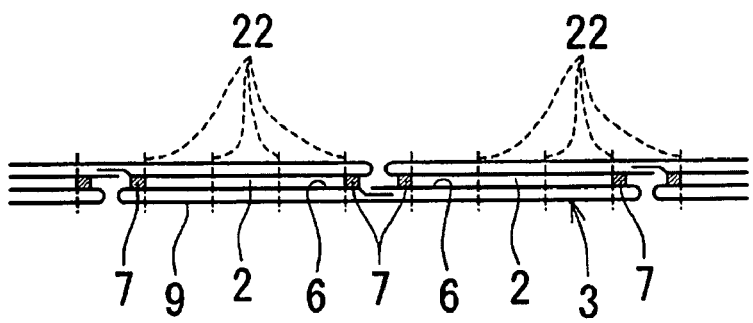
FIG. 8 is a schematic drawing that shows a flattened state of the continuous assemblage of pots for raising and transplanting seedlings shown in FIG. 7.
Figure 9:
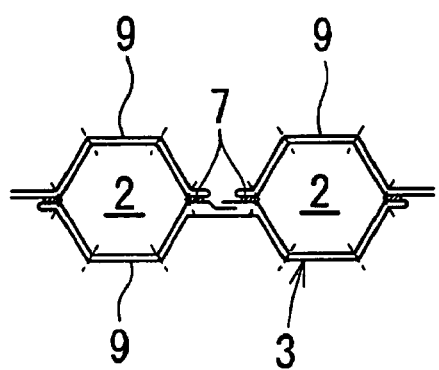
FIG. 9 is a schematic drawing that shows an expanded state of the continuous assemblage of pots for raising and transplanting seedlings shown in FIG. 7.

Note that in the first and second embodiments, in the individual pots 2 and 12, which are formed by expanding the continuous assemblages of pots 1 and 11, respectively, it is desirable to form perforations 22 in positions that correspond to the lines where adjacent sides of each hexagonal tubular pot meet. FIGS. 7 to 9 show the perforations that are formed in the link pieces 3 in the first embodiment. As shown in FIGS. 7 and 8, four rows of the perforations 22 are formed in the non-attached portions (individual pots 2) that are formed between the attachment portions 7 of the link pieces 3 in the flattened state, and the distance between two rows of the perforations 22 is set to the length of one side of the individual pot 2. Thus, when the continuous assemblage of pots 1 in which the perforations 22 are formed is expanded, as shown in FIG. 9, each hexagonal tubular individual pot 2 expands uniformly due to the perforations 22, reducing the tensile force that is required during expansion and reducing the effort required of a worker. Note that appropriate widths of and intervals between the perforations 22 can be selected, but when seedlings are raised in the continuous assemblage of pots 1 (11), and the individual pots 2 (12) and the connecting portions 9 (19) are pulled out, as shown in FIGS. 3 and 6, for transplanting into a field, the perforations 22 must be sufficiently strong that they are not severed.

Figure 10:
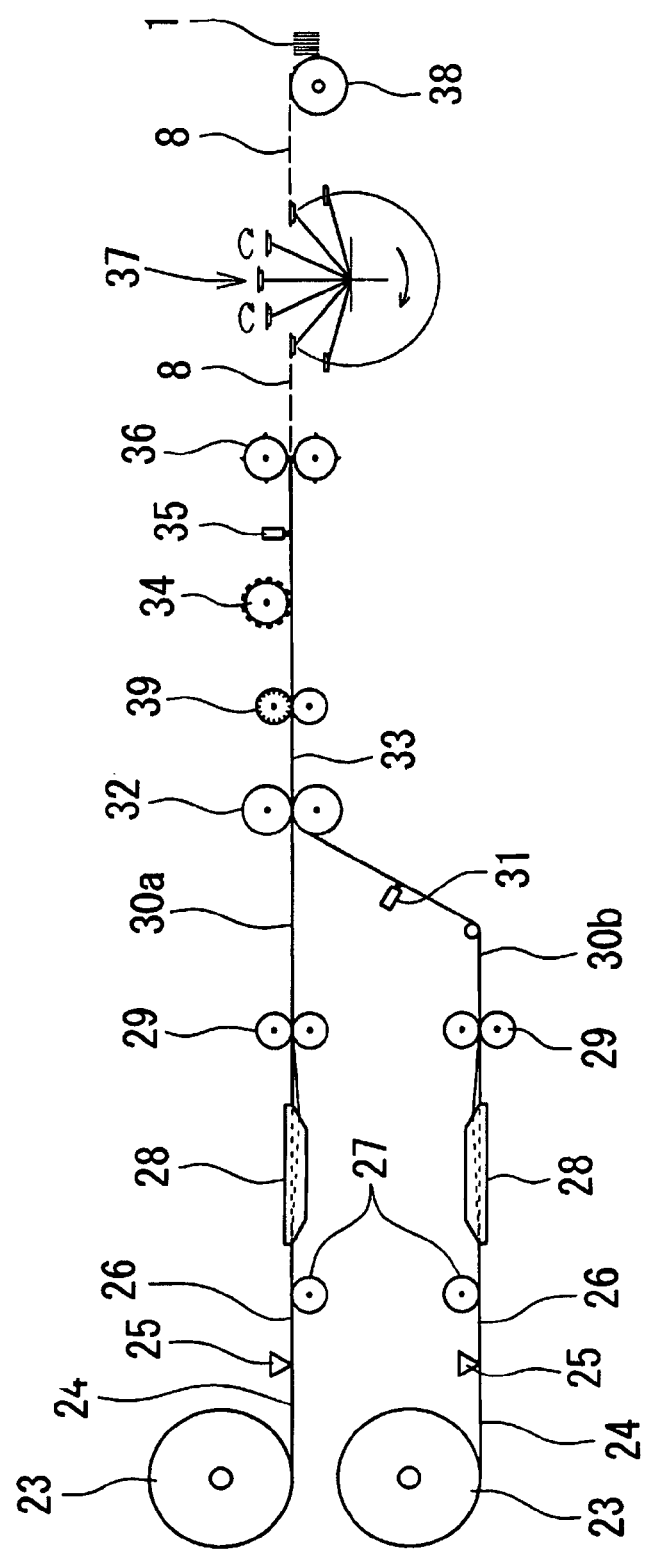
FIG. 10 is a schematic drawing that shows a manufacturing process for the continuous assemblage of (hexagonal tubular) pots for raising and transplanting seedlings according to the first embodiment of the present invention.

Next, a method of manufacturing the continuous assemblage of pots 1 in the first embodiment will be explained based on FIG. 10. First, base papers 24 are pulled out from base paper rolls 23, which are wound wide, thin films (the base papers). Each base paper 24 is cut by a slitter 25 into a specified number of strip-shaped thin films 26 of a specified width. Each strip-shaped thin film 26 is guided to a tube-making adhesive application roller 27 and a tube-making unit 28 in that order. The tube-making adhesive application roller 27 applies a water-soluble adhesive to one side of the strip-shaped thin film 26, and the tube-making unit 28 forms the strip-shaped thin film 26 into a tubular shape. The strip-shaped thin films 26 that are formed into tubular shapes are sent to pressing rollers 29, which form the strip-shaped thin films 26 into strip-shaped link pieces 30a, 30b and strip-shaped folded-back pieces (not shown in the drawing) by attaching the inner faces of the strip-shaped thin films 26. Next, the strip-shaped link pieces 30a, 30b are arranged such that the upper and lower strip-shaped link pieces 30a, 30b are staggered. A link piece adhesive application unit 31 applies lines of a non-water-soluble adhesive to the lower strip-shaped link pieces 30b, and the strip-shaped link pieces 30a, 30b are sent to flattening rollers 32. The flattening rollers 32 attach the strip-shaped link pieces 30a to the strip-shaped link pieces 30b (at the attachment portions 7 in FIG. 2) to form strip-shaped continuous pieces 33.

At this time, strip-shaped folded-over pieces (not shown in the drawing) of a specified length are positioned at both ends of the strip-shaped continuous piece 33 and are attached by the flattening rollers 32. This causes the cross section shape of the strip-shaped continuous piece 33 to become the same as the cross section shape of the continuous piece 8. (Refer to FIG. 2.) Next, the strip-shaped continuous piece 33 is guided to a layering adhesive application roller 34 and a layering adhesive application unit 35, in that order. The layering adhesive application roller 34 applies a water-soluble adhesive to the top side of the strip-shaped continuous piece 33, and the layering adhesive application unit 35 applies a non-water-soluble adhesive to the strip-shaped folded-over pieces that are positioned at the ends of the strip-shaped continuous piece 33 (and which are formed into the folded-over piece 4 and the folded-over piece 5). The strip-shaped continuous piece 33, to which the adhesives have been applied, is cut to a specified length (equal to the height of the individual pots 2) by rotary cutters 36 to form the continuous piece 8. At the next stage, an inverting unit 37 rotates every second continuous pieces 8 for 180 degrees. The continuous pieces 8 are then sent to a layering attachment unit 38, where the continuous pieces 8 are attached to one another using a water-soluble adhesive and the folded-over pieces are attached to one another using a non-water-soluble adhesive to form the continuous assemblage of pots 1.

Note that a device that detects the quantity of the strip-shaped continuous pieces 33 that have passed by is provided in the vicinity of the layering adhesive application roller 34, although it is not shown in the drawing. When a specified quantity of the strip-shaped continuous pieces 33 has been sent to the rotary cutters 36, the layering adhesive application roller 34 rises, so that the water-soluble adhesive is not applied to the top face of the strip-shaped continuous piece 33 for an interval that corresponds to the length of one continuous piece 8 (the height of the individual pot 2). Thus it is possible for the layering attachment unit 38 to layer and attach a specified number of the continuous pieces 8 to produce one continuous assemblage of pots 1 at a time.

A method of manufacturing the continuous assemblage of pots 11 in the second embodiment, which groups the individual pots 12, basically follows the same flow described above for the first embodiment and will be explained using the reference numerals shown in FIG. 10. First, base papers 24 are pulled out from base paper rolls 23, and each base paper 24 is cut by a slitter 25 into strip-shaped thin films 26. Tube-making adhesive application rollers 27 apply a water-soluble adhesive to approximately one-third of the total length of one side of each strip-shaped thin film 26. Tube-making units 28 fold back only the portions of the strip-shaped thin films 26 to which the tube-making adhesive application rollers 27 applied the adhesive, and pressing rollers 29 attach the folded-back portions to form strip-shaped link pieces 30a, 30b. Next, the strip-shaped link pieces 30a, 30b are arranged in the same manner as in the first embodiment, and a link piece adhesive application unit 31 applies lines of a non-water-soluble adhesive to the lower strip-shaped link pieces 30b. Flattening rollers 32 attach the strip-shaped link pieces 30a to the strip-shaped link pieces 30b.

Here, the direction in which the strip-shaped thin films 26 are folded back in the tube-making units 28 is set such that the folded-back portions of opposing strip-shaped link pieces 30a, 30b (the portions that correspond to the folded-back portions 16 of the link pieces 13) are attached to one another and the other ends of the strip-shaped link pieces 30a, 30b (the portions that correspond to the other end portions 21 of the link pieces 13), to which the folded-back portions 16 are not attached, are attached to one another. The strip-shaped folded-back pieces (the pieces that are formed into the folded-over piece 14 and the folded-over piece 15, not shown in the drawing), in which the lengths that are cut by the slitters 25 are different from the lengths that are folded back by the tube-making units 28, are processed in the same manner. The strip-shaped folded-back piece that corresponds to the folded-over piece 14 is attached to one end of a strip-shaped continuous piece 33, and the strip-shaped folded-back piece that corresponds to the folded-over piece 15 is attached to the other end of the strip-shaped continuous piece 33. This causes the strip-shaped continuous piece 33 to be formed with a cross section shape that is the same as the cross section shape of the continuous piece 18. (Refer to FIG. 5.) Next, the strip-shaped continuous piece 33 is sent to a layering adhesive application roller 34, a layering adhesive application unit 35, and rotary cutters 36, in that order, and the continuous piece 18 is formed.

Next, the continuous piece 18 is sent to an inverting unit 37 and a layering attachment unit 38, where the continuous assemblage of pots 11, in which the hexagonal tubular individual pots 12 are grouped, is completed. Note that the point about detecting the quantity of the strip-shaped continuous pieces 33 that have passed by and providing an area where the water-soluble adhesive is not applied to the top face of the strip-shaped continuous piece 33 is the same as described above.

Also, with regard to the manufacturing of the continuous assemblage of pots 1, 11 in the first and second embodiments, it is desirable to form the perforations 22, as shown in FIG. 7, at the line the corresponding to the edge of the (hexagonal tubular) individual pots 2, 12 that are formed by expanding the continuous assemblages of pots 1, 11. As shown in FIG. 10, a perforation processing unit 39 may be positioned immediately after the flattening rollers 32, and the perforations 22 may be formed in the non-attached portions (the individual pots 2 or the individual pots 12) of the link pieces 3 and the folded-over pieces 4, 5 or the link pieces 13 and the folded-over pieces 14, 15.

Figure 11:
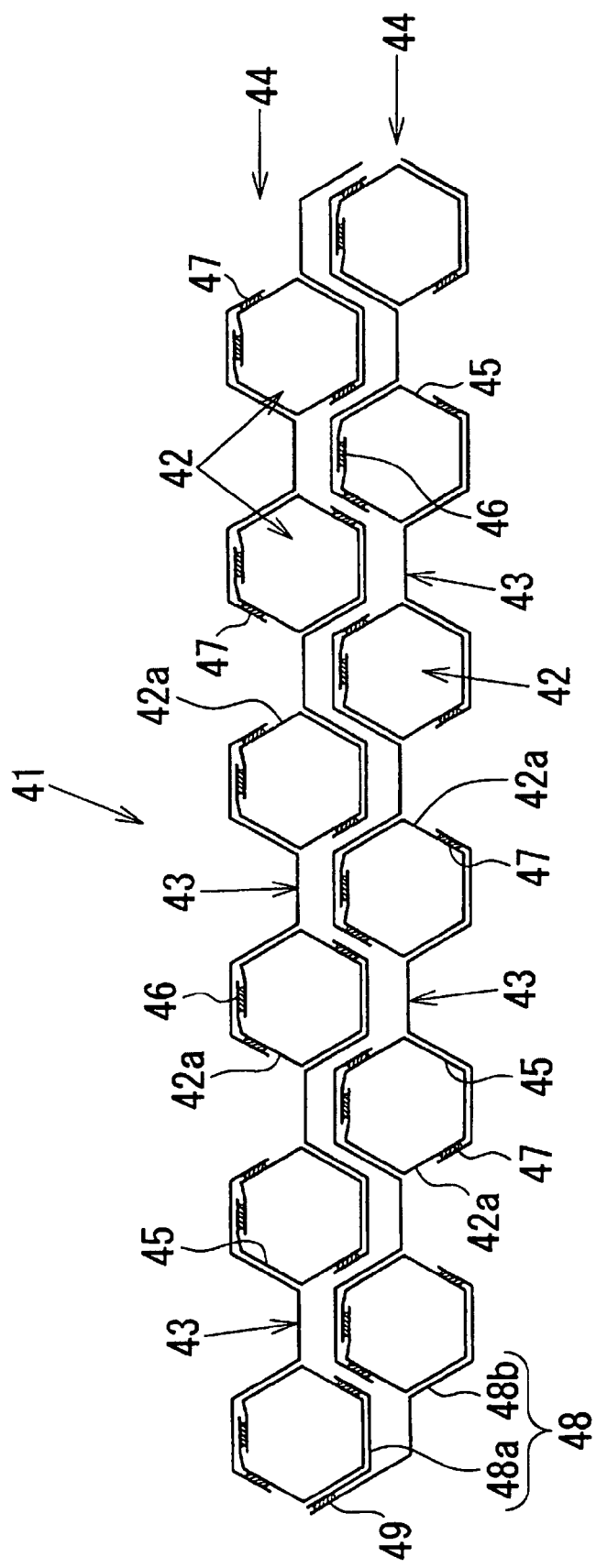
FIG. 11 is a plan view that schematically shows a structure of a continuous assemblage of (hexagonal tubular) pots for raising and transplanting seedlings according to a third embodiment of the present invention.
Figure 12:
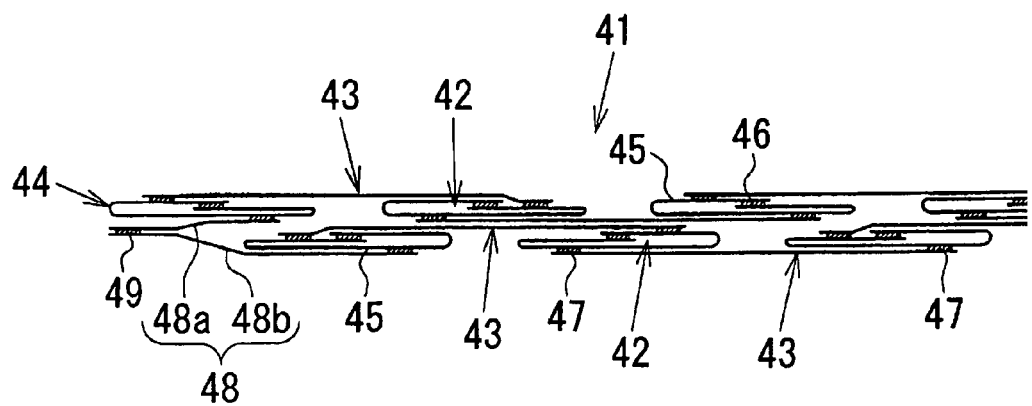
FIG. 12 is a schematic drawing that shows a flattened state of the continuous assemblage of pots for raising and transplanting seedlings shown in FIG. 11.

Next, a third embodiment of the present invention will be explained based on FIGS. 11 to 15. FIGS. 11 and 12 show a continuous assemblage of pots for raising and transplanting seedlings according to the third embodiment of the present invention. The third embodiment groups a plurality of hexagonal tubular individual pots 42, and the individual pots 42 are connected by link pieces 43. A series of continuous pieces 44 is formed by the individual pots 42 and the link pieces 43, with the individual pots 42 overlapped such that they are offset by one-half pitch, with a water-soluble adhesive between them. A continuous assemblage of pots 41 that tightly groups the individual pots 42 is formed by the series of the continuous pieces 44. Note that in FIGS. 11 and 12, the gaps between the individual pots 42 and the link pieces 43, as well as the gaps between the rows of the continuous pieces 44, are shown as open to aid understanding, but actually, a water-soluble adhesive that is not shown in the drawings is interposed in the gaps.

Each of the individual pots 42 is formed into a tubular shape by using a non-water-soluble adhesive to attach overlapping ends of a thin film 45 (at an attachment portion 46). The individual pots 42 are arranged such that they are separated by gaps that are equal to the length of one side face of the individual pot 42 (one side of the hexagonal shape). The link pieces 43 are formed as separate pieces from the individual pots 42 and are positioned in parallel on both sides of the individual pots 42 in a staggered arrangement. In this embodiment, both ends of each link piece 43 are attached to side faces 42a, which are the farthest-separated faces of two adjacent individual pots 42, and are attached on the inner side by a non-water-soluble adhesive at positions (attachment portions 47) close to vertices of the hexagonal individual pots 42. Therefore, in this embodiment, each of the link pieces 43 has a length that is approximately five times the length of one side face of the individual pot 42.

Each continuous piece 44 is formed by using a water-soluble adhesive (not shown in the drawings) to attach the link pieces 43 to the side faces of the individual pots 42. The continuous pieces 44 are also rotated 180 degrees (inverted) at specified length intervals and overlapped on one another. In this case, a folded-back piece 48, which is longer than the prescribed length of the link piece 43, is required at the location where the overlapping portions of the continuous pieces 44 are linked. In this embodiment the folded-back piece 48 is divided into two segments, as shown in FIGS. 11 and 12. A segment 48a is attached to an individual pot 42 that is positioned at an end of the continuous piece 44 on the upper side, and a segment 48b is attached to an individual pot 42 that is positioned at an end of the continuous piece 44 on the lower side. The segments 48a, 48b are attached to one another at an attachment portion 49 by a non-water-soluble adhesive.

Figure 13:
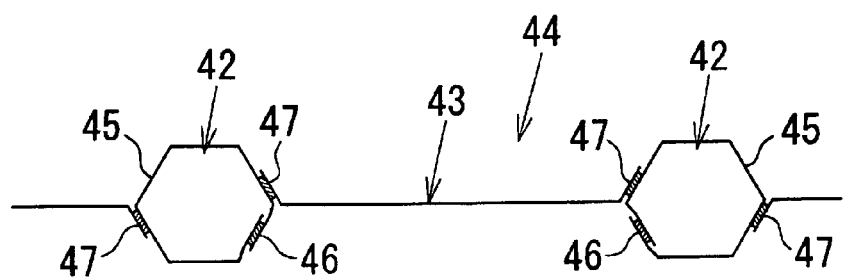
FIG. 13 is a schematic drawing that shows a pulled-apart state of the continuous assemblage of pots for raising and transplanting seedlings shown in FIG. 11.
Figure 14:
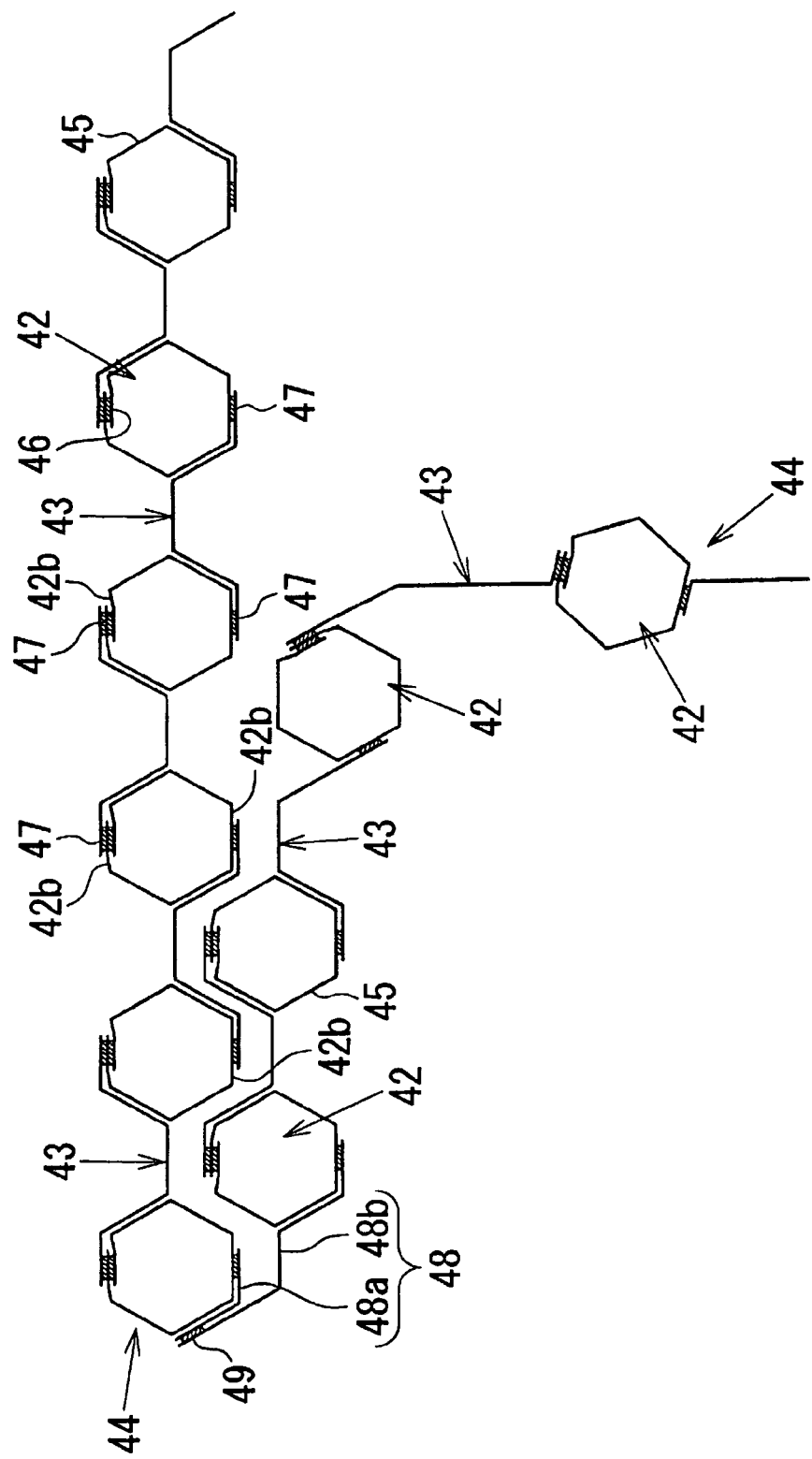
FIG. 14 is a plan view that schematically shows a structure of a continuous assemblage of pots for raising and transplanting seedlings according to an application example of the third embodiment of the present invention.

The continuous assemblage of pots 41 that is structured in this way is provided and stored in a flattened state, as shown in FIG. 12. Starting from the flattened state, the continuous pieces 44 are pulled open in the layering direction, expanding into a plurality of the individual pots 42 in a honeycomb pattern, as shown in FIG. 11, and forming the continuous assemblage of pots 41 of a specified size. When the seedlings are raised, the continuous assemblage of pots 41, in the expanded state, is set into a cultivation box (not shown in the drawings), and each individual pot 42 is filled with a cultivation soil, into which the seeds are sown. After the seedlings have been raised for a specified number of days, the water-soluble adhesive on the side faces of the individual pots 42 and between the link pieces 43 and the water-soluble adhesive between the continuous pieces 44 become degraded by the watering during the raising of the seedlings. Therefore, during transplanting after the seedlings are raised, when one end of the continuous pieces 44 that make up the continuous assemblage of pots 41 is pulled, as shown in FIG. 13, the continuous pieces 44 are pulled out in sequence, such that efficient planting is possible. In this case, as described above, the length of the link piece 43 becomes approximately five times the length of one side of the individual pot 42, so the continuous assemblage of pots 41 can effectively handle the cultivation of a crop that requires a wide interval between the planted seedlings.

In this embodiment, the link pieces 43 can be adjusted to various lengths changing the positions of the attachment portions 47 in relation to adjacent individual pots 42. For example, FIG. 14 (in which the same reference numerals are used for the same portions) shows an example in which the length of the link piece 43 is set to approximately 3.5 times the length of one side of the individual pot 42. In this case, the ends of the link piece 43 may be attached by a non-water-soluble adhesive (at the attachment portions 47) to middle positions on side faces 42b, 42b of adjacent individual pots 42, setting an intermediate distance between the adjacent individual pots 42.

Figure 15:
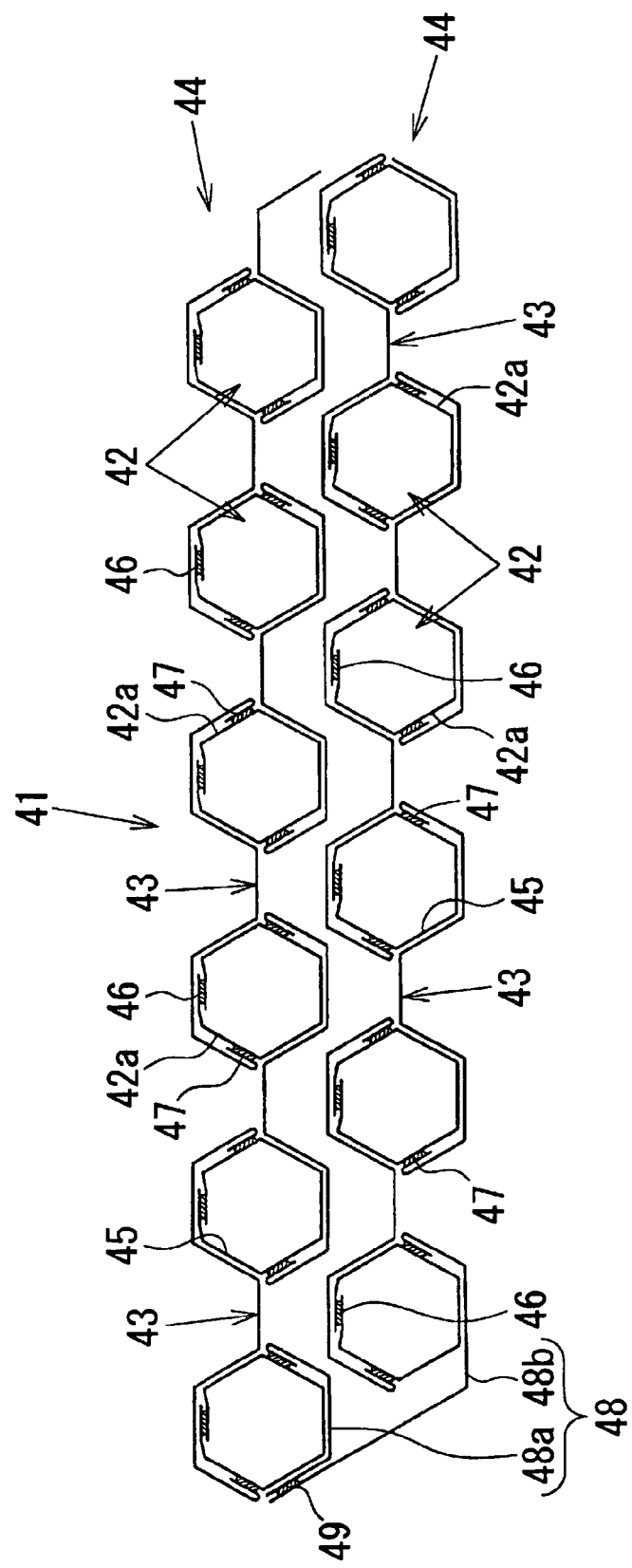
FIG. 15 is a plan view that schematically shows a structure of a continuous assemblage of pots for raising and transplanting seedlings according to another application example of the third embodiment of the present invention.

Also, FIG. 15 (in which the same reference numerals are used for the same portions) shows an example in which the length of the link piece 43 is set to approximately seven times the length of one side of the individual pot 42. In this case, the ends of the link piece 43 are attached to the side faces 42a, 42a, which are the farthest-separated faces of the adjacent individual pots 42, and are attached on the outer side by a non-water-soluble adhesive at positions (the attachment portions 47) close to the vertices of the hexagonal individual pots 42. Also, both ends of the link piece 43 are folded back into support points for the outer edges of the attachment portions 47. Note that in the example shown in FIG. 15, if the ends of the link piece 43 are not folded back at the attachment portions 47, the length of the link piece 43 is set to approximately 6.5 times the length of one side of the individual pot 42.

Also, in the third embodiment, both ends of the link piece 43 are attached to positions (for example, on the side faces 42a and 42b) at which the adjacent individual pots 42 are symmetrical, and the link pieces 43 are extended equally between the adjacent individual pots 42. However, the link pieces 43 may, of course, be extended unequally between the adjacent individual pots 42. In that case, the lengths of the link pieces 43 can be varied in small increments within a range of one to seven times the length of one side of the individual pot 42.

Next, a variation of the third embodiment of the present invention will be explained based on FIGS. 16 to 18. In the third embodiment, a plurality of square tubular individual pots 52 are grouped, and the individual pots 52 are connected by link pieces 53. A series of continuous pieces 54 is formed by the individual pots 52 and the link pieces 53, with the individual pots 52 overlapped in a grid pattern, with a water-soluble adhesive between them. A continuous assemblage of pots 51 that tightly groups the individual pots 52 is formed by the series of the continuous pieces 54. Note that in FIG. 16, the gaps between the individual pots 52 and the link pieces 53, as well as the gaps between the rows of the continuous pieces 54, are shown as open to aid understanding, but actually, a water-soluble adhesive that is not shown in the drawings is interposed in the gaps.

Each of the individual pots 52 is formed into a tubular shape by using a non-water-soluble adhesive to attach overlapping ends of one sheet a thin film 55 (at an attachment portion 56). The individual pots 52 are arranged such that a side face of the individual pot 52 is in close contact with a side face of the adjacent individual pot 52, forming a grid pattern. As shown in FIG. 17, the link pieces 53 are formed as separate pieces from the individual pots 52 and are positioned in parallel on both sides of the individual pots 52 in a staggered arrangement such that a gap is formed between the adjacent individual pots 52 that is equal to the length of one side of the individual pot 52 (one side of the square tube). In this embodiment, the ends of each link piece 53 are attached to the adjacent individual pots 52 by a non-water-soluble adhesive at the farthest-separated positions (attachment portions 57) on the adjacent individual pots 52. Therefore, in this embodiment, each of the link pieces 53 has a length that is approximately five times the length of one side face of the individual pot 52.

Each continuous piece 54 is formed by using a water-soluble adhesive (not shown in the drawings) to attach the link pieces 53 to the side faces of the individual pots 52. As shown in FIG. 18, each continuous piece 54 is formed by folding back each link piece 53 (in the directions of arrows R, R') along the side face of the individual pot 52 such that the individual pots 52 overlap by the length of one side face, then attaching the link pieces 53 to the side faces of the individual pots 52 with a water-soluble adhesive. Every second continuous pieces 54 is also rotated 180 degrees (inverted) and overlapped on the adjacent continuous piece 54, as shown in FIG. 16. Note that in this case, a folded-back piece 58 that is of the same specified length as the link piece 53 is required at the location where the overlapping continuous piece 54 are linked. In this embodiment the folded-back piece 58 is divided into two segments 58a, 58b, which are respectively attached to the individual pots 52 that are positioned at both ends of the continuous pieces 54. The segments 58a, 58b are attached to one another at an attachment portion 59 by a non-water-soluble adhesive.

The continuous assemblage of pots 51 that is structured in this way is provided and stored in a flattened state. Starting from the flattened state, the continuous pieces 54 are pulled open in the layering direction, expanding into a plurality of the individual pots 52 in a grid pattern, as shown in FIG. 16, and forming the continuous assemblage of pots 51 of a specified size. The continuous assemblage of pots 51 differs from the (hexagonal tubular) continuous assemblage of pots 41 in the (square tubular) shape of the individual pots 52 and the form in which the continuous pieces 54 are linked, but the methods of sowing the seeds, raising the seedlings, and the like are the same as with the continuous assemblage of pots 41. Also, in this embodiment, the length of the link piece 53 is five times the length of one side face of the individual pot 52, but the length of the link piece 53 (the interval between the planted seedlings) can be set to any length in the range of one to five times the length of one side face of the individual pot 52, depending on the crop that will be cultivated.

Note that in the third embodiment, it is desirable to form perforations in the individual pots 42 and 52, which are formed by expanding the continuous assemblages of pots 41 and 51, at positions that correspond to the lines where adjacent sides of each hexagonal and square tubular pot meet.

Also, the materials for the thin films that are used in the continuous assemblages of pots 41 and 51, and the types of adhesives that are used, may be freely selected in the same manner that is described for the first and second embodiments.

Base papers 69, 69 are pulled out from the base paper rolls 61, 61 and cut by slitters 70, 70 into a specified number of strip-shaped link pieces 71, 71 of a specified width. Each strip-shaped link piece 71 is guided to two link piece adhesive application units 72, 73 in that order. The first-stage link piece adhesive application unit 72 applies to both side edges of the strip-shaped link piece 71 a non-water-soluble adhesive that will form the attachment portions 47. The second-stage link piece adhesive application unit 73 applies a water-soluble adhesive to the strip-shaped link piece 71, except in a specified area in a central portion of the strip-shaped link piece 71. The strip-shaped link pieces 71 are then sent to the linking rollers 68. At this time, the strip-shaped link pieces 71 are guided to the linking rollers 68 in such a way that the strip-shaped link pieces 71 will be arranged in a staggered manner on both sides of the continuous pieces 44 (refer to FIGS. 11, 14, and 15), that is, in such a way that the strip-shaped link pieces 71 will sandwich the strip-shaped tubes 67 from above and below. Thus, a strip-shaped continuous piece 74 is formed that has a cross section shape that is the same as the cross section shape of the continuous piece 44 (refer to FIG. 12).

Next, the strip-shaped continuous piece 74 is guided to a layering adhesive application roller 75 and a layering adhesive application unit 76, in that order. The layering adhesive application roller 75 applies a water-soluble adhesive to the top side of the strip-shaped continuous piece 74, and the layering adhesive application unit 76 applies a non-water-soluble adhesive that will form the attachment portion 49 of the folded-back piece 48 at the end of the strip-shaped continuous piece 74. The strip-shaped continuous piece 74, to which the adhesives have been applied, is cut to a specified length (corresponding to the height of the individual pots 42) by rotary cutters 77, thereby forming the continuous piece 44. At the next stage, an inverting unit 78 rotates every second continuous pieces 44 for 180 degrees. The continuous pieces 44 are then sent to a layering attachment unit 79, where the continuous pieces 44 are attached to one another in layers using a water-soluble adhesive and the folded-back pieces are attached to one another using a non-water-soluble adhesive to form the continuous assemblage of pots 41.

Note that in this embodiment, a device that detects the quantity of the strip-shaped continuous pieces 74 that have passed by is provided on the layering adhesive application roller 75, although it is not shown in the drawing. When a specified quantity of the strip-shaped continuous pieces 74 has been sent to the rotary cutters 77, the layering adhesive application roller 75 rises, so that the water-soluble adhesive is not applied to the top side of the strip-shaped continuous piece 74 for an interval that corresponds to the length of one continuous piece 44 (the height of the individual pot 42). Thus it is possible for the layering attachment unit 79 to layer and attach a specified number of the continuous pieces 44 to produce one continuous assemblage of pots 41 at a time.

Note that in the case where the continuous assemblage of pots 41 is manufactured in the form in which both ends of the link pieces 43 are folded back and attached at the attachment portions 47, as shown in FIG. 15, a process that folds back both ends of the link piece 71 is provided at the stage immediately prior to the link piece adhesive application unit 72.

Figure 16:
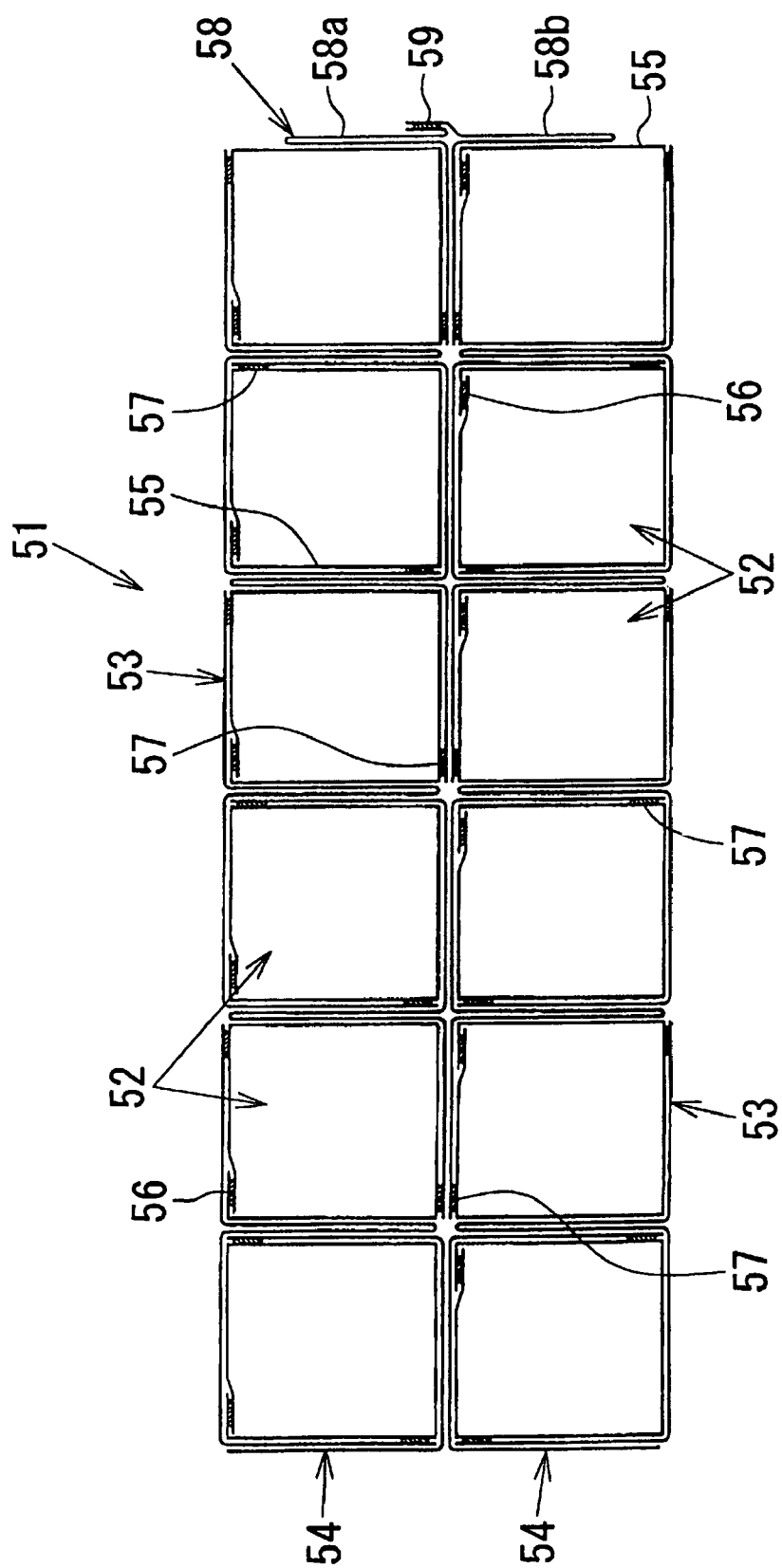
FIG. 16 is a plan view that schematically shows a structure of a continuous assemblage of (square tubular) pots for raising and transplanting seedlings according to an example of a variation of the third embodiment of the present invention.
Figure 17:
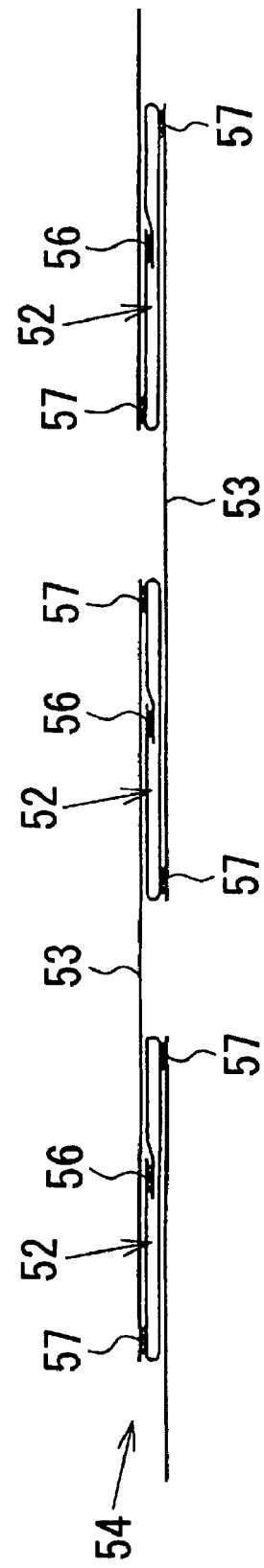
FIG. 17 is a schematic drawing that shows individual pots and link pieces in an attached state in the continuous assemblage of pots for raising and transplanting seedlings shown in FIG. 16.
Figure 18:
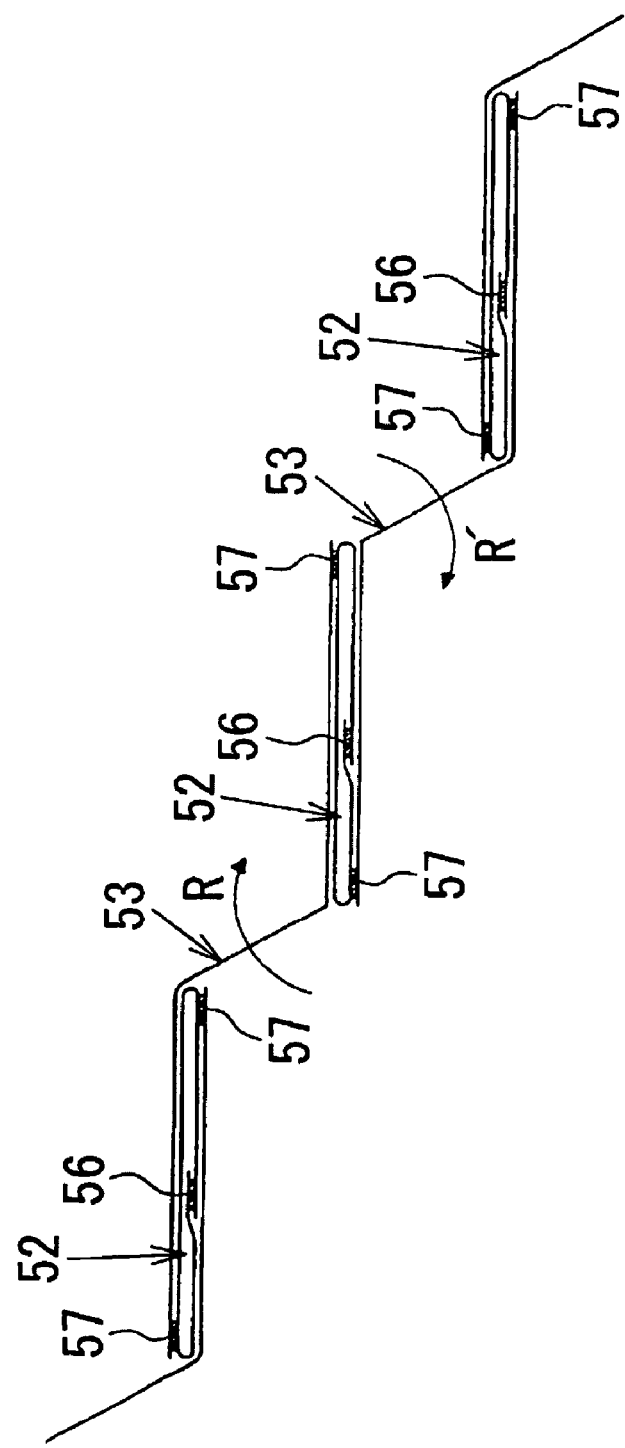
FIG. 18 is a schematic drawing that shows a process that forms a continuous piece in the continuous assemblage of pots for raising and transplanting seedlings shown in FIG. 16.
Figure 19:
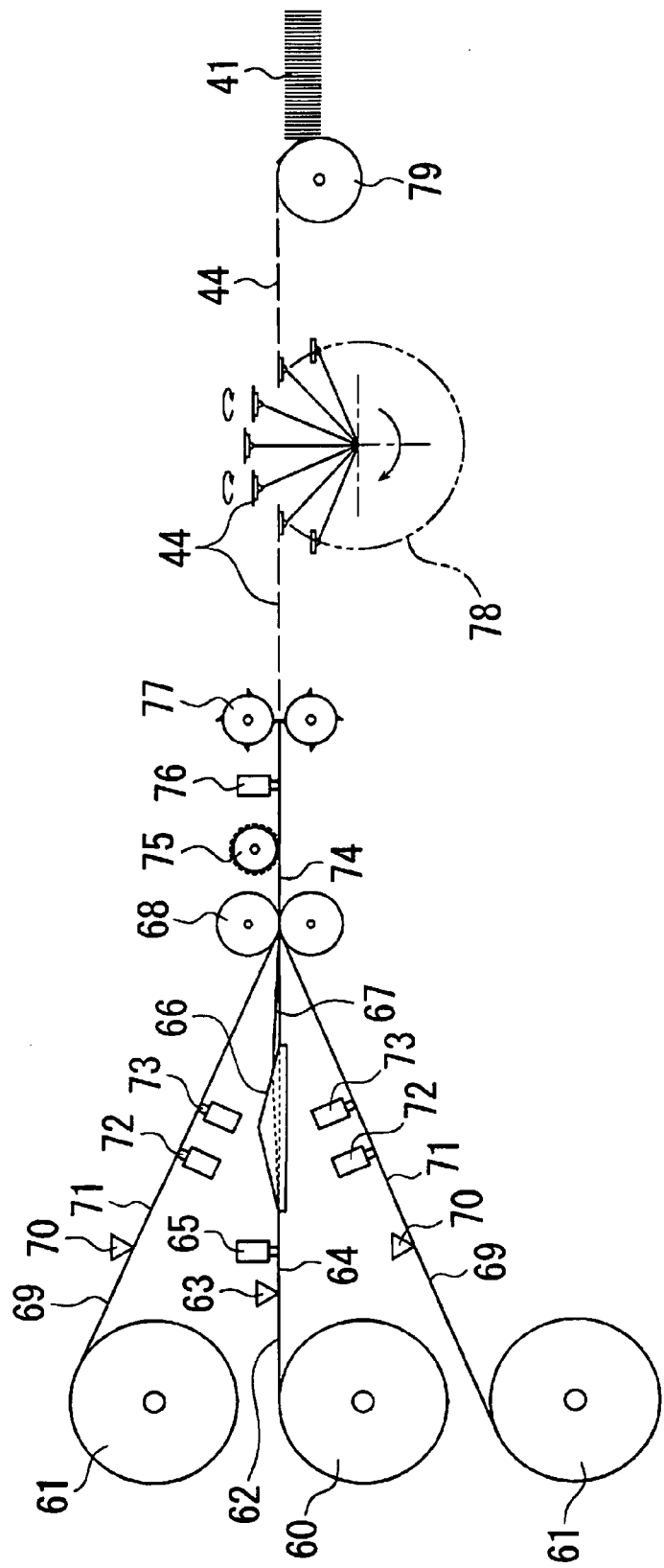
FIG. 19 is a schematic drawing that shows a manufacturing process for the continuous assemblage of (hexagonal tubular) pots for raising and transplanting seedlings according to the third embodiment of the present invention.

A method of manufacturing the variation of the third embodiment that is shown in FIGS. 16 and 17, in which the continuous assemblage of pots 51 groups square tubular individual pots 52, is basically the same as the manufacturing flow that is shown in FIG. 19 and will be explained below using the reference numerals that are shown in FIG. 19.

First, a base paper 62 that is pulled out from a first base paper roll 60 is cut by a slitter 63 into strip-shaped thin films 64. A tube-making adhesive application unit 65 applies a non-water-soluble adhesive, and a tube-making unit 66 forms a strip-shaped tube 67 that has a cross section of the same size as the cross section of the individual pot 52. Base papers 69, 69 are pulled out from two second base paper rolls 61,61 and cut by slitters 70, 70 into strip-shaped link pieces 71, 71. A non-water-soluble adhesive is applied to both side edges of each strip-shaped link piece 71, and a water-soluble adhesive is applied to each strip-shaped link piece 71, except in a central portion of the strip-shaped link piece 71. The strip-shaped link pieces 71 are then guided to linking rollers 68 in such a way that the strip-shaped link pieces 71, 71 will sandwich the strip-shaped tubes 67 from above and below, and both of the strip-shaped link pieces 71, 71 are linked.

In the case where the continuous assemblage of pots 51, which groups the square tubular individual pots 52, is manufactured, a folding-back adhesive application unit, a folding-back unit, and a continuous piece forming roller, none of which are shown in the drawing, are provided at the stage immediately after the linking rollers 68. First the folding-back adhesive application unit applies a water-soluble adhesive to both sides of the strip-shaped link pieces 71, then the folding-back unit folds back the strip-shaped link pieces 71 in relation to the strip-shaped tube 67, which is provided as the individual pot 52 (refer to FIG. 18). The continuous piece forming roller forms the strip-shaped continuous piece 74, which has a cross section shape that is the same as the cross section shape of the continuous piece 54.

The strip-shaped continuous piece 74 that is formed in this way is thereafter sent, according to the manufacturing flow that is shown in FIG. 19, to a layering adhesive application roller 75, a layering adhesive application unit 76, and rotary cutters 77, thereby becoming the continuous piece 54. The continuous piece 54 is then sent to an inverting unit 78 and a layering attachment unit 79, which produces the completed continuous assemblage of pots 51 that groups the square tubular individual pots 52. Note that the point about detecting the quantity of the strip-shaped continuous pieces 74 that have passed by and providing an area where the water-soluble adhesive is not applied to the top face of the strip-shaped continuous piece 74 is the same as described above.

Also, with regard to the manufacturing of the continuous assemblage of pots 41, 51 in the third embodiment, it is desirable to form perforations in positions that correspond to the lines where adjacent sides of each hexagonal and square tubular pot meet in the individual pots 42, 52, which are formed by expanding the continuous assemblages of pots 41, 51. A perforation processing unit (not shown in the drawing) may be positioned immediately after the linking rollers 68 in FIG. 19, and the perforations may be formed in the side faces of the individual pots 42 and the individual pots 52.

Figure 20:
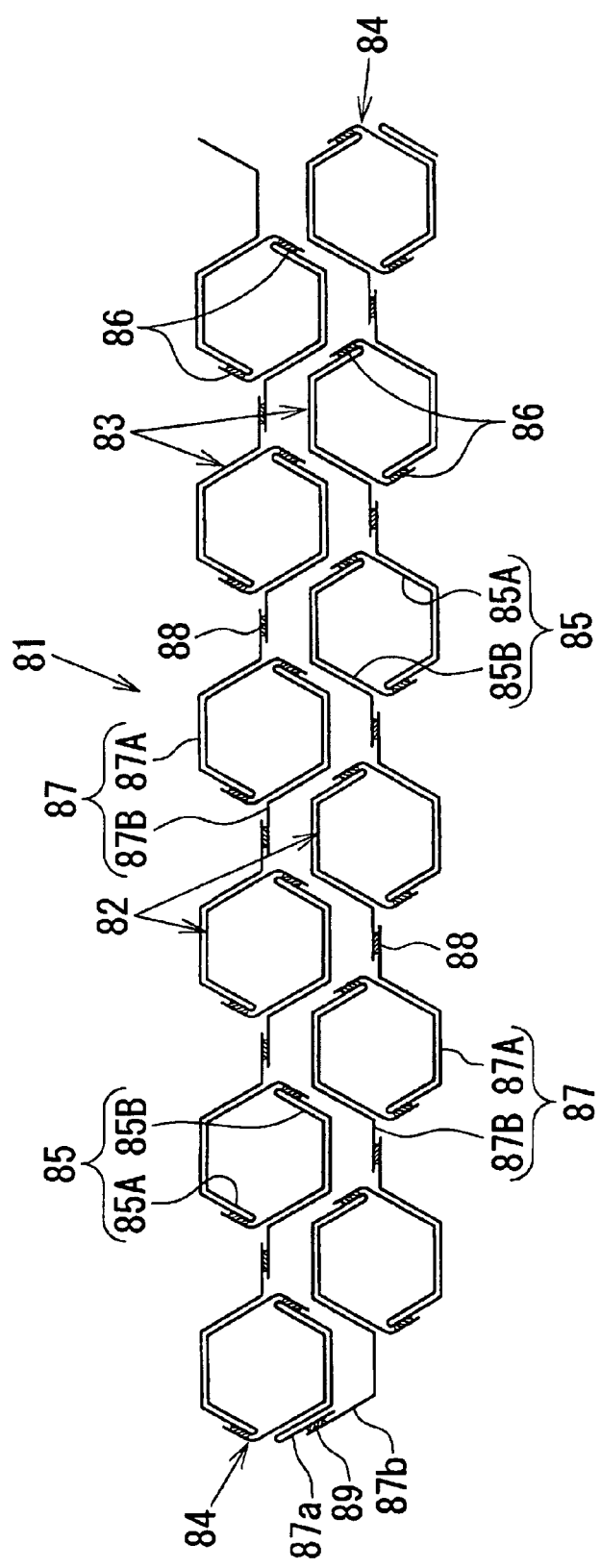
FIG. 20 is a plan view that schematically shows a structure of a continuous assemblage of (hexagonal tubular) pots for raising and transplanting seedlings according to a fourth embodiment of the present invention.
Figure 21:
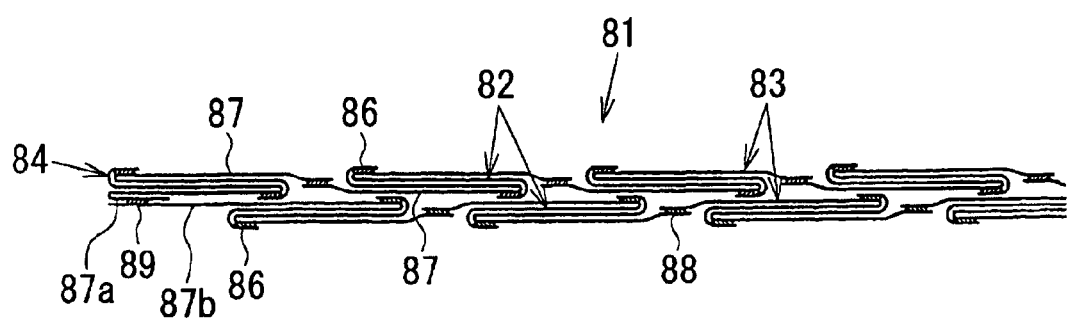
FIG. 21 is a schematic drawing that shows a flattened state of the continuous assemblage of pots for raising and transplanting seedlings shown in FIG. 20.
Figure 22:
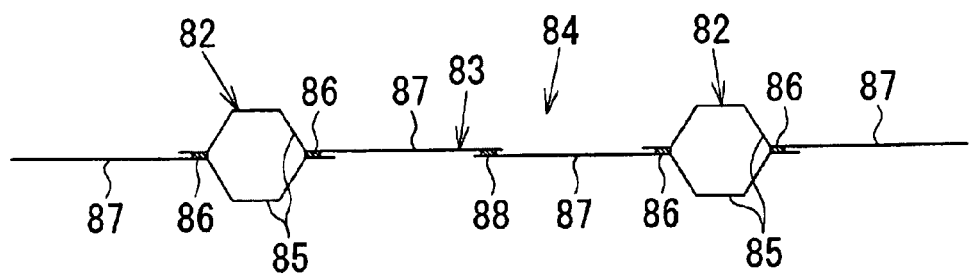
FIG. 22 is a schematic drawing that shows a pulled-apart state of the continuous assemblage of pots for raising and transplanting seedlings shown in FIG. 20.

Next, a fourth embodiment of the present invention will be explained based on FIGS. 20 to 22. FIGS. 20 and 21 show a continuous assemblage of pots for raising and transplanting seedlings according to the fourth embodiment of the present invention. The fourth embodiment groups a plurality of hexagonal tubular individual pots 82, and the individual pots 82 are connected by link pieces 83. A series of continuous pieces 84 is formed by the individual pots 82 and the link pieces 83, with the individual pots 82 overlapped such that they are offset by one-half pitch, with a water-soluble adhesive between them. A continuous assemblage of pots 81 that tightly groups the individual pots 82 is formed by the series of the continuous pieces 84. Note that in FIGS. 20 and 21, the gaps between the individual pots 82 and the link pieces 83, as well as the gaps between the rows of the continuous pieces 84, are shown as open to aid understanding, but actually, a water-soluble adhesive that is not shown in the drawings is interposed in the gaps.

Each of the individual pots 82 is formed by attaching two thin films 85 (85A, 85B) to one another. A non-water-soluble adhesive is used to attach the two thin films 85 to one another at attachment portions 86 in two locations on the left and right that are separated by a specified gap. Inner side portions of the two attachment portions 86 are provided as the individual pot 82. The link pieces 83 are provided on both sides of the individual pot 82 and are formed by using a non-water-soluble adhesive to attach (at attachment portions 88) ends of extension pieces 87 (87A, 87B) of the thin films 85. Of the extension pieces 87, the extension piece 87A on one end is provided on the thin film 85A on one side, and the extension piece 87B on the other end is provided on the thin film 85B on the other side. The extension pieces 87A, 87B are folded back along the side faces of the individual pot 82 in opposite directions and are attached to the side faces of the individual pot 82 using a water-soluble adhesive. The length of each of the extension pieces 87 is set such that the attachment portions 88 are positioned at intermediate locations between the adjacent individual pots 82. Thus, the link piece 83 has a length that is approximately seven times the length of one side of the individual pot 82.

The continuous pieces 84 are rotated 180 degrees (inverted) at specified length intervals and overlapped on one another. In this case, at the location where the overlapping portions of the continuous pieces 84 are linked, as shown in FIGS. 20 and 21, a non-water-soluble adhesive at an attachment portion 89 is used to connect a folded-back portion 87a to an extra long portion 87b. The folded-back portion 87a is formed at an end of the extension piece 87 that is attached to the individual pot 82 that is positioned at an end of the continuous piece 84 on the upper side, and the extra long portion 87b is formed at an end of the extension piece 87 that is attached to the individual pot 82 that is positioned at an end of the continuous piece 84 on the lower side.

The continuous assemblage of pots 81 that is structured in this way is provided and stored in a flattened state, as shown in FIG. 21. Starting from the flattened state, the continuous pieces 84 are pulled open in the layering direction, expanding into a plurality of the individual pots 82 in a honeycomb pattern, as shown in FIG. 20, and forming the continuous assemblage of pots 81 of a specified size. When the seedlings are raised, the continuous assemblage of pots 81, in the expanded state, is set into a cultivation box (not shown in the drawings), and each individual pot 82 is filled with a cultivation soil, into which the seeds are sown. After the seedlings have been raised for a specified number of days, the water-soluble adhesive between the extension pieces 87 of the thin films 85 and the side faces of the individual pots 82 and the water-soluble adhesive between the continuous pieces 84 become degraded by the watering during the raising of the seedlings. Therefore, during transplanting after the seedlings are raised, when one end of the continuous pieces 84 that make up the continuous assemblage of pots 81 is pulled, as shown in FIG. 22, the continuous pieces 84 are pulled out in sequence, such that efficient planting is possible. In this case, the length of the link piece 83 becomes approximately seven times the length of one side of the individual pot 82, so the continuous assemblage of pots 81 can effectively handle the cultivation of a crop that requires a wide interval between the planted seedlings. In this embodiment, the attached faces of the attachment portions 86, 88, 89, in particular, which form the individual pots 82 and the link pieces 83, are parallel to the direction in which the continuous pieces 84 are pulled out (FIG. 22), so the shear stress at the attachment portions 86, 88, 89 is sufficiently large in relation to the tensile force that the continuous pieces 84 are pulled out stably during planting.

Figure 25:
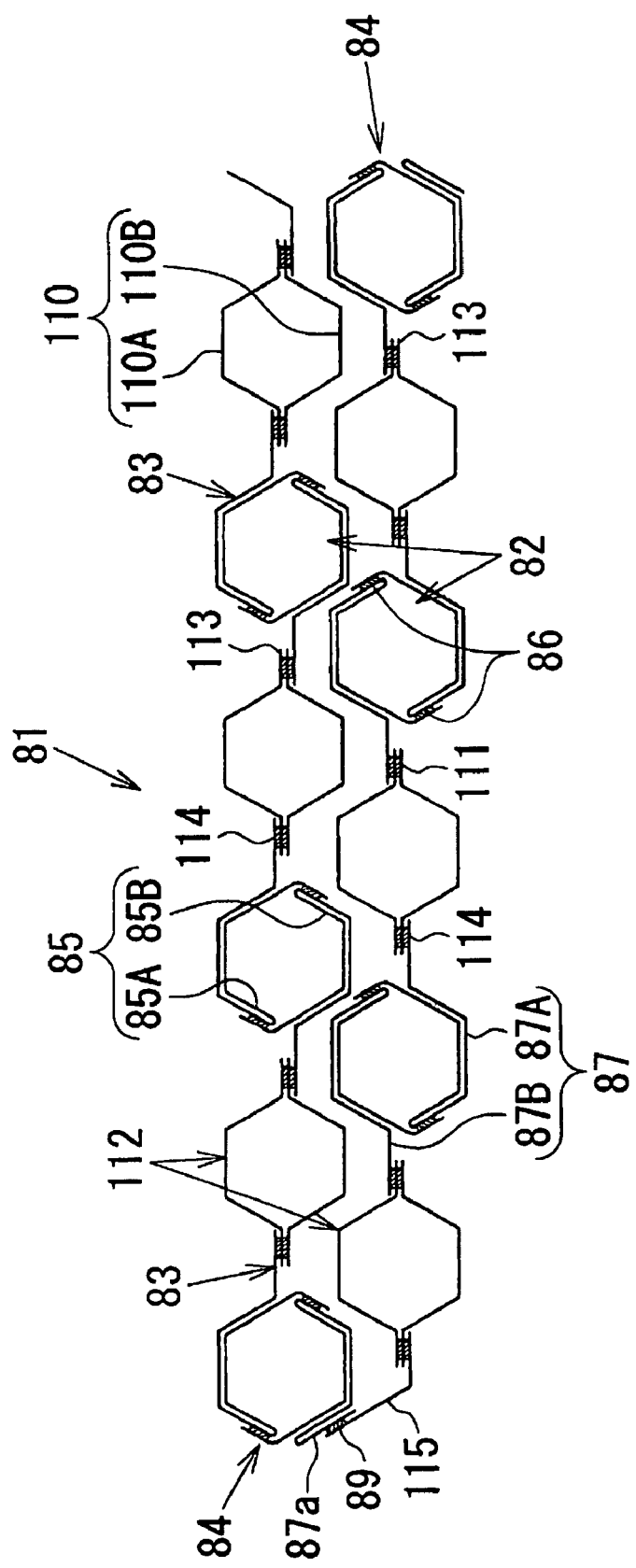
FIG. 25 is a plan view that schematically shows a structure of a continuous assemblage of (hexagonal tubular) pots for raising and transplanting seedlings according to a fifth embodiment of the present invention.
Figure 26:
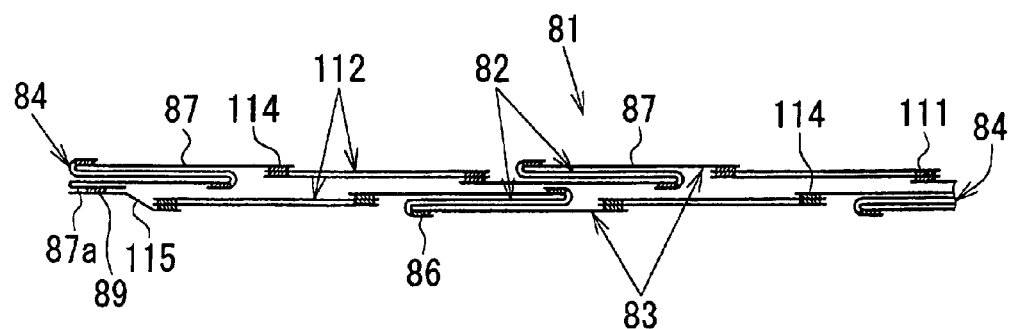
FIG. 26 is a schematic drawing that shows a flattened state of the continuous assemblage of pots for raising and transplanting seedlings shown in FIG. 25.
Figure 27:
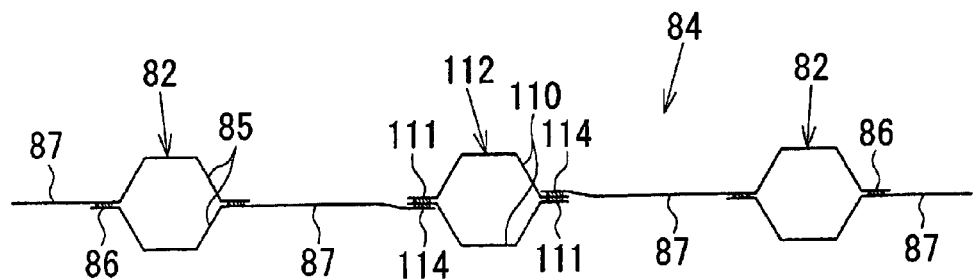
FIG. 27 is a schematic drawing that shows a pulled-apart state of the continuous assemblage of pots for raising and transplanting seedlings shown in FIG. 25.

Next, a fifth embodiment of the present invention will be explained based on FIGS. 25 to 27. FIGS. 25 and 26 show a continuous assemblage of pots for raising and transplanting seedlings according to the fifth embodiment of the present invention. The fifth embodiment groups a plurality of hexagonal tubular individual pots 82 in the same manner as in the fourth embodiment. Therefore, the point about the individual pots 82 being connected by link pieces 83, the point about a series of continuous pieces 84 being formed by the individual pots 82 and the link pieces 83, with the individual pots 82 overlapped such that they are offset by one-half pitch, with a water-soluble adhesive between them, and the point about a continuous assemblage of pots 81 that tightly groups the individual pots 82 being formed by the series of the continuous pieces 84 are the same as in the fourth embodiment.

Therefore, in this embodiment, the same reference numerals are used for the portions that are the same as the portions that are shown in FIGS. 20 and 21.

In the fifth embodiment, the individual pots 82 (hereinafter called the first individual pots 82), which have extension pieces 87 (87A, 87B) of two thin films 85 (85A, 85B) on both sides, in exactly the same form as in the fourth embodiment, are arranged in the continuous piece 84 in alternation with individual pots 112 (hereinafter called the second individual pots 112), which do not have the extension pieces 87 (87A, 87B) on both sides. The second individual pots 112 are formed by attaching two thin films 110 (110A, 110B) to one another, but parts corresponding to the extension pieces 87 are omitted by providing adhesive regions 113 that are only as much of a non-water-soluble adhesive as is necessary to form attachment portions 111. The link pieces 83 are formed by using a non-water-soluble adhesive to attach (at attachment portions 114) the ends of the extension pieces 87, which are provided on both sides of the first individual pots 82, to the adhesive regions 113 of the second individual pots 112. In this case, the point about the extension pieces 87 being folded back along the side faces of the first individual pots 82 and attached by a water-soluble adhesive to the side faces of the individual pots 82 is the same as in the fourth embodiment. Therefore, the link piece 83 has a length that is approximately four times the length of a side face of an individual pot 82. In the fifth embodiment, the layered state of the continuous pieces 84 is the same as in the fourth embodiment, and every second continuous pieces 84 is inverted and overlapped on the adjacent continuous piece 84 to form the continuous assemblage of pots 81. Note that a separate, short link-assisting piece 115 is provided at the folded-back portion of the continuous piece 84.

The operation of the continuous assemblage of pots 81 that is structured in this way is the same as in the fourth embodiment. The water-soluble adhesive between the extension pieces 87 of the thin films 85 and the side faces of the first individual pots 82 and the water-soluble adhesive between the continuous pieces 84 become degraded by the watering during the raising of the seedlings. Therefore, during transplanting after the seedlings are raised, when one end of the continuous pieces 84 that make up the continuous assemblage of pots 81 is pulled, as shown in FIG. 27, the continuous pieces 84 are pulled out in sequence, such that efficient planting is possible. In this case, the length of the link piece 83 becomes approximately four times the length of one side of the individual pots 82, 112, so the continuous assemblage of pots 81 can effectively handle the cultivation of a crop that requires a wide interval between the planted seedlings.

Figure 23:
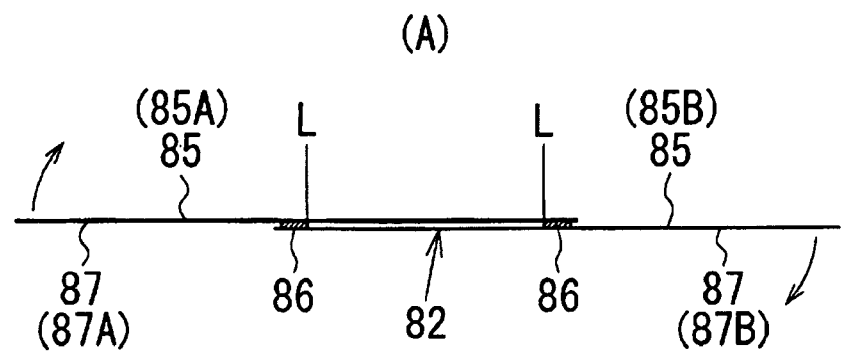
FIG. 23 is a schematic drawing that shows in summary form a manufacturing process for the continuous assemblage of pots for raising and transplanting seedlings shown in FIG. 20.
Figure 23:
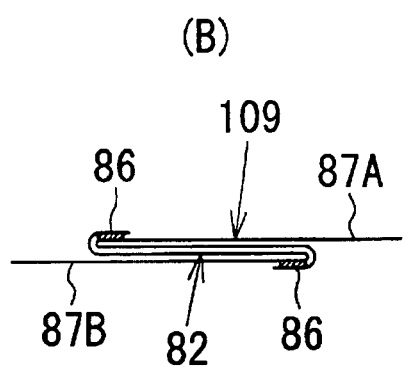
Figure 23:
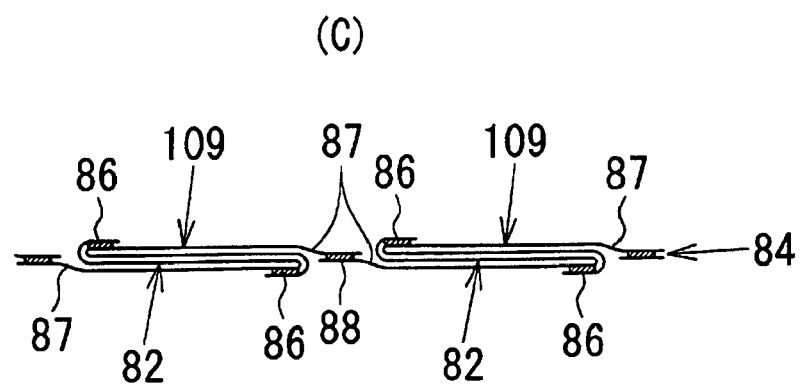

Next, a method of manufacturing the continuous assemblage of pots 81 in the fourth embodiment will be explained based on FIGS. 23 and 24. First, as shown in FIG. 23(A), the two thin films 85A, 85B are arranged such that they are offset from one another in the left and right directions while overlapping by a specified length. The overlapping portions are attached to one another by a non-water-soluble adhesive at the attachment portions 86 at both ends, with the portions that extend outside the attachment portions 86 serving as the extension pieces 87A, 87B. Next, as shown in FIG. 23(B), the extension pieces 87A, 87B are folded back in opposite directions, with the folds being formed at folding lines L, which are set at the inner edges of the attachment portions 86. Each of the extension pieces 87A, 87B is attached by a water-soluble adhesive to a side face of the individual pot 82, which is formed in a flattened state between the attachment portions 86. At this time, the extending ends (free ends) of the extension pieces 87A, 87B extend laterally for a specified distance from opposite ends of the flattened individual pot 82, forming an intermediate piece 109 that is in a folded state, as shown in the drawing. Next, as shown in FIG. 23(C), a specified number of the intermediate pieces 109 are arranged in a row, and the ends of the extension pieces 87 are attached to one another with a non-water-soluble adhesive (at the attachment portions 88) between the adjacent intermediate pieces 109, thus forming the series of the continuous pieces 84. Next, every second continuous pieces 84 is rotated for 180 degrees (inverted), and the required number of the continuous pieces 84 are layered, with a water-soluble adhesive interposed between the layers.

Next, a method of manufacturing the continuous assemblage of pots 81 in the fourth embodiment will be explained based on FIGS. 23 and 24. First, as shown in FIG. 23(A), the two thin films 85A, 85B are arranged such that they are offset from one another in the left and right directions while overlapping by a specified length. The overlapping portions are attached to one another by a non-water-soluble adhesive at the attachment portions 86 at both ends, with the portions that extend outside the attachment portions 86 serving as the extension pieces 87A, 87B. Next, as shown in FIG. 23(B), the extension pieces 87A, 87B are folded back in opposite directions, with the folds being formed at folding lines L, which are set at the inner edges of the attachment portions 86. Each of the extension pieces 87A, 87B is attached by a water-soluble adhesive to a side face of the individual pot 82, which is formed in a flattened state between the attachment portions 86. At this time, the extending ends (free ends) of the extension pieces 87A, 87B extend laterally for a specified distance from opposite ends of the flattened individual pot 82, forming an intermediate piece 109 that is in a folded state, as shown in the drawing. Next, as shown in FIG. 23(C), a specified number of the intermediate pieces 109 are arranged in a row, and the ends of the extension pieces 87 are attached to one another with a non-water-soluble adhesive (at the attachment portions 88) between the adjacent intermediate pieces 109, thus forming the series of the continuous pieces 84. Next, every second continuous pieces 84 is rotated for 180 degrees (inverted), and the required number of the continuous pieces 84 are layered, with a water-soluble adhesive interposed between the layers.

Figure 24:
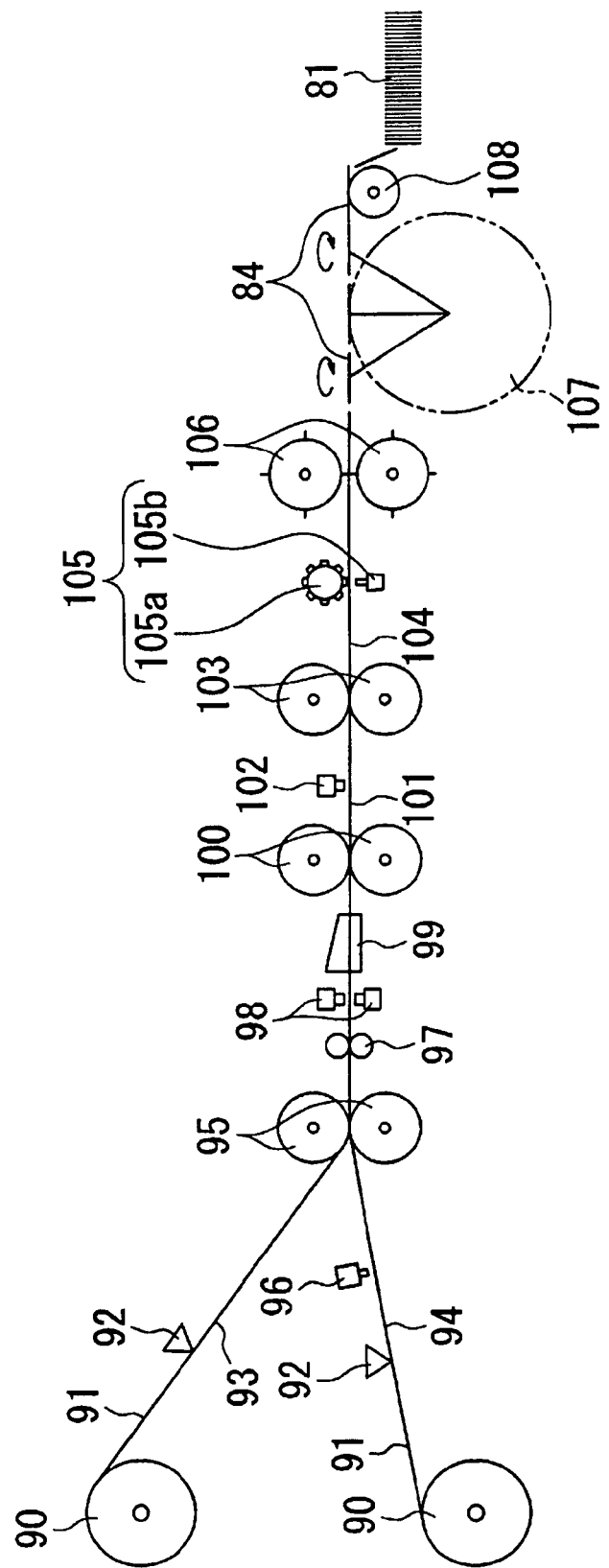
FIG. 24 is a schematic drawing that shows the manufacturing process for the continuous assemblage of pots for raising and transplanting seedlings shown in FIG. 20.

FIG. 24 shows a configuration for manufacturing the continuous assemblage of pots 81 (in hexagonal tubular form). In this case, an upper-lower pair of base paper rolls 90, 90, which are wound wide, thin films (base papers), is prepared in advance. Base papers 91 are pulled out from the base paper rolls 90 and are guided to slitters 92, which cut the base papers 91 into upper and lower strip-shaped thin films 93, 94 of a specified length. The upper and lower strip-shaped thin films 93, 94 are sent to tube-making rollers 95 in a positional relationship in which they overlap by a specified length. At this time, a pot adhesive application unit 96, which is positioned at a stage prior to the tube-making rollers 95, applies a non-water-soluble adhesive to the top face of the lower strip-shaped thin film 94 in two lines that are separated by a specified interval (the interval between the attachment portions 86 in FIG. 23(A)). Thus the overlapping portions of the upper and lower strip-shaped thin films 93, 94 are attached by the non-water-soluble adhesive while they pass through the tube-making rollers 95. That is, a non-attached portion, which is provided as the individual pot 82, is formed between the upper and lower strip-shaped thin films 93, 94.

After passing through the tube-making rollers 95, the upper and lower strip-shaped thin films 93, 94 are sent to folding rollers 100 by way of a folding line forming unit 97, a folding adhesive application unit 98, and a folding unit 99, in that order. The folding line forming unit 97 forms the folding lines L (refer to FIG. 23(A)) along the inner edges of the attachment portions 86. The folding adhesive application unit 98 applies a water-soluble adhesive to both faces of the overlapping portions of the upper and lower strip-shaped thin films 93, 94. The folding unit 99 folds the non-overlapping portions of the upper and lower strip-shaped thin films 93, 94 (corresponding to the extension pieces 87A, 87B of the thin films 85A, 85B) along the folding lines L, and the folding rollers 100 attach the folded portions of the upper and lower strip-shaped thin films 93, 94. This process produces strip-shaped intermediate pieces 101, which have a cross section shape that is the same as that of the intermediate piece 109 (refer to FIG. 23(B)).

A plurality of the strip-shaped intermediate pieces 101 move in a row to a link piece adhesive application unit 102, which applies a non-water-soluble adhesive to an end of one of the non-overlapping portions of each strip-shaped intermediate piece 101 in the row. The plurality of strip-shaped intermediate pieces 101 in the row is sent to linking rollers 103, with the other ends of the strip-shaped intermediate pieces 101 slightly overlapping the ends to which the non-water-soluble adhesive was applied. The plurality of the strip-shaped intermediate pieces 101 are linked to one another by the non-water-soluble adhesive at the linking rollers 103 (corresponding to the linking of the ends of the extension pieces 87), thereby becoming a wide strip-shaped continuous piece 104 (refer to FIG. 23(C)). Note that portions are formed at the ends of the strip-shaped continuous piece 104 that correspond to the folded-back portion 87*a* and the extra long portion 87*b* that are required for the linking of the continuous pieces 84.

Next, the strip-shaped continuous piece 104 is sent to a layering adhesive application unit 105, where a layering adhesive application roller 105*a* applies a water-soluble adhesive to the top face of the strip-shaped continuous piece 104 and a layering adhesive application nozzle 105*b* applies a non-water-soluble adhesive to the end of the strip-shaped continuous piece 104 that corresponds to the folded-back portion 87*a*. Next, the strip-shaped continuous piece 104 is cut to a specified length (equal to the height of the individual pot 82) by rotary cutters 106, thereby forming the continuous piece 84. At the next stage, an inverting unit 107 rotates every second continuous pieces 84 for 180 degrees. The continuous pieces 84 are then sent to a layering attachment unit 108, where the continuous pieces 84 are attached to one another using a water-soluble adhesive and the folded-back portions 87*a* and the extra long portions 87*b* are attached to one another using a non-water-soluble adhesive to form the continuous assemblage of pots 81.

Note that a device that detects the quantity of the strip-shaped continuous pieces 104 that have passed by is provided in the vicinity of the layering adhesive application unit 105, although it is not shown in the drawing. When a specified number of the strip-shaped continuous pieces 104 has been sent to the rotary cutters 106, the layering adhesive application roller 105*a* rises, so that the water-soluble adhesive is not applied to the top side of the strip-shaped continuous piece 104 for an interval that corresponds to the length of one continuous piece 84 (the height of the individual pot 82). Thus it is possible for the layering attachment unit 108 to layer and attach a specified number of the continuous pieces 84 to produce one continuous assemblage of pots 81 at a time.

In the fourth embodiment, the two thin films 85 (85A, 85B) that are used have the same width (same length) and are overlapped by a specified length, and the extension pieces 87 (87A, 87B) are provided on the mutually overlapping thin films. However, in the present invention, the extension piece 87 may be provided on only one of the thin films, and the thin film may be attached to the other thin film, which may have only the length required to form the individual pot 82.

A method of manufacturing the continuous assemblage of pots 81 in the fifth embodiment is basically the same as in the case of the fourth embodiment, but the first individual pots 82, which have the extension pieces 87 of the thin films 85 on both sides, and the second individual pots 112, which do not have the extension pieces 87, are formed separately. The extension pieces 87 are folded back along the side faces of the first individual pots 82, and the extension pieces 87 are attached by the water-soluble adhesive to the side faces of the first individual pots 82. The link pieces 83 are formed by lining up the first individual pots 82 and the second individual pots 112, then using the non-water-soluble adhesive to attach the ends of the extension pieces 87 of the first individual pots 82 to the adhesive regions 113 of the second individual pots 112. Next, the continuous pieces 84 are overlapped, then layered and attached to one another with the water-soluble adhesive.

Figure 28:
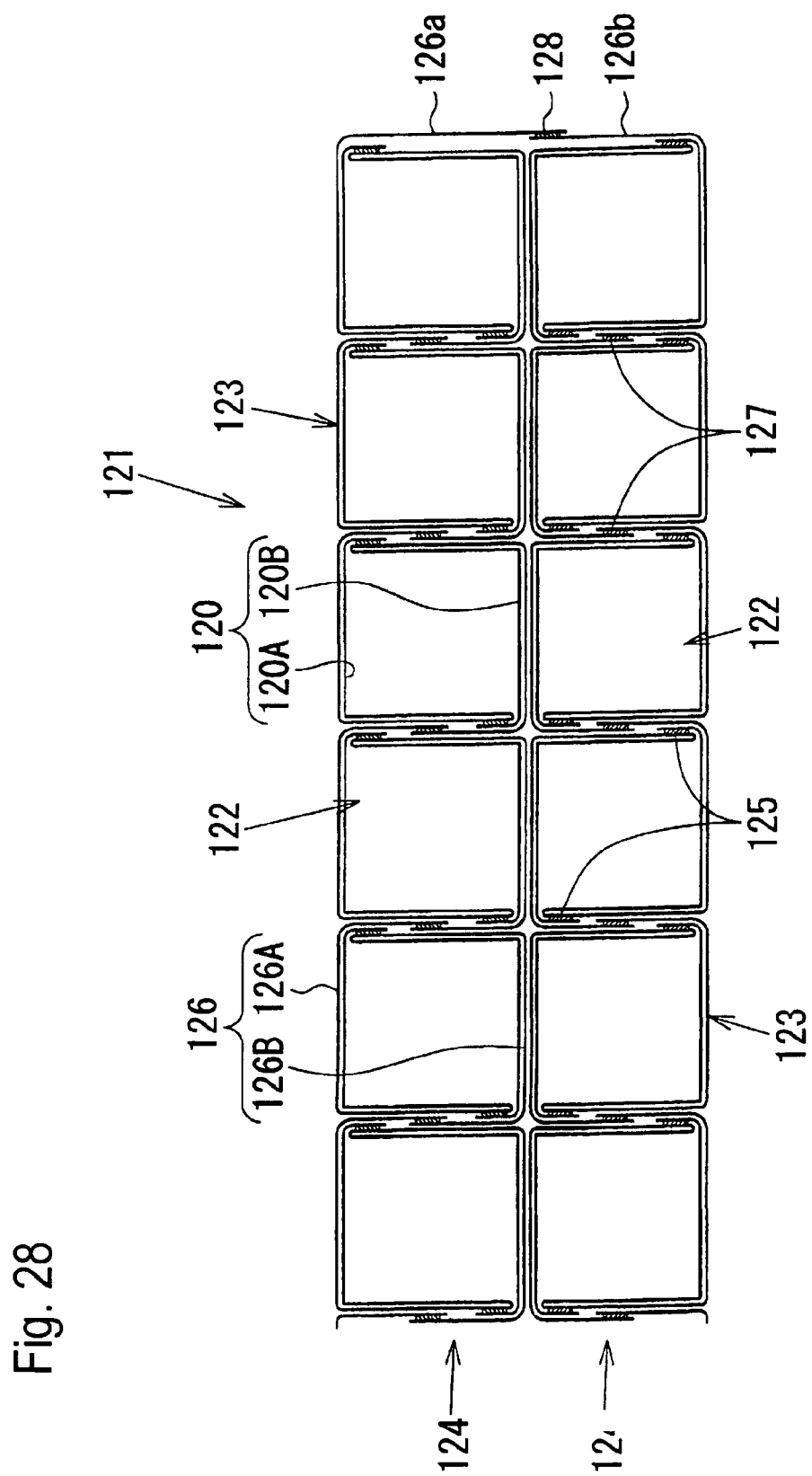
FIG. 28 is a plan view that schematically shows a structure of a continuous assemblage of (square tubular) pots for raising and transplanting seedlings according to an example of a variation of the fourth embodiment of the present invention.
Figure 29:
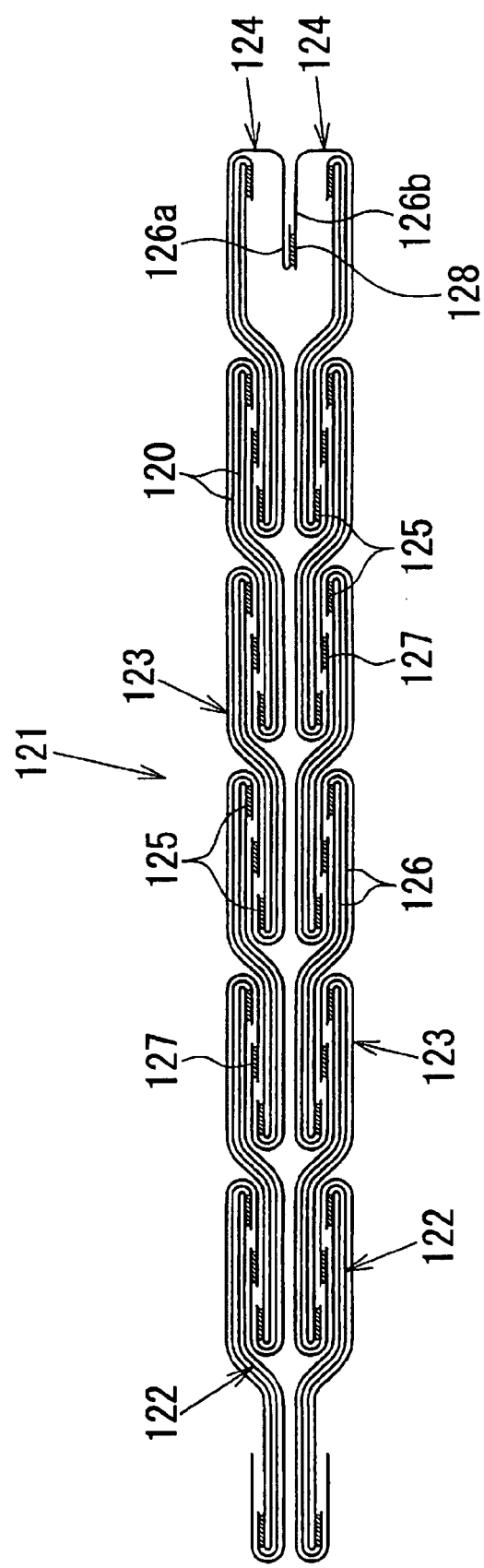
FIG. 29 is a schematic drawing that shows a flattened state of the continuous assemblage of pots for raising and transplanting seedlings shown in FIG. 28.
Figure 30:
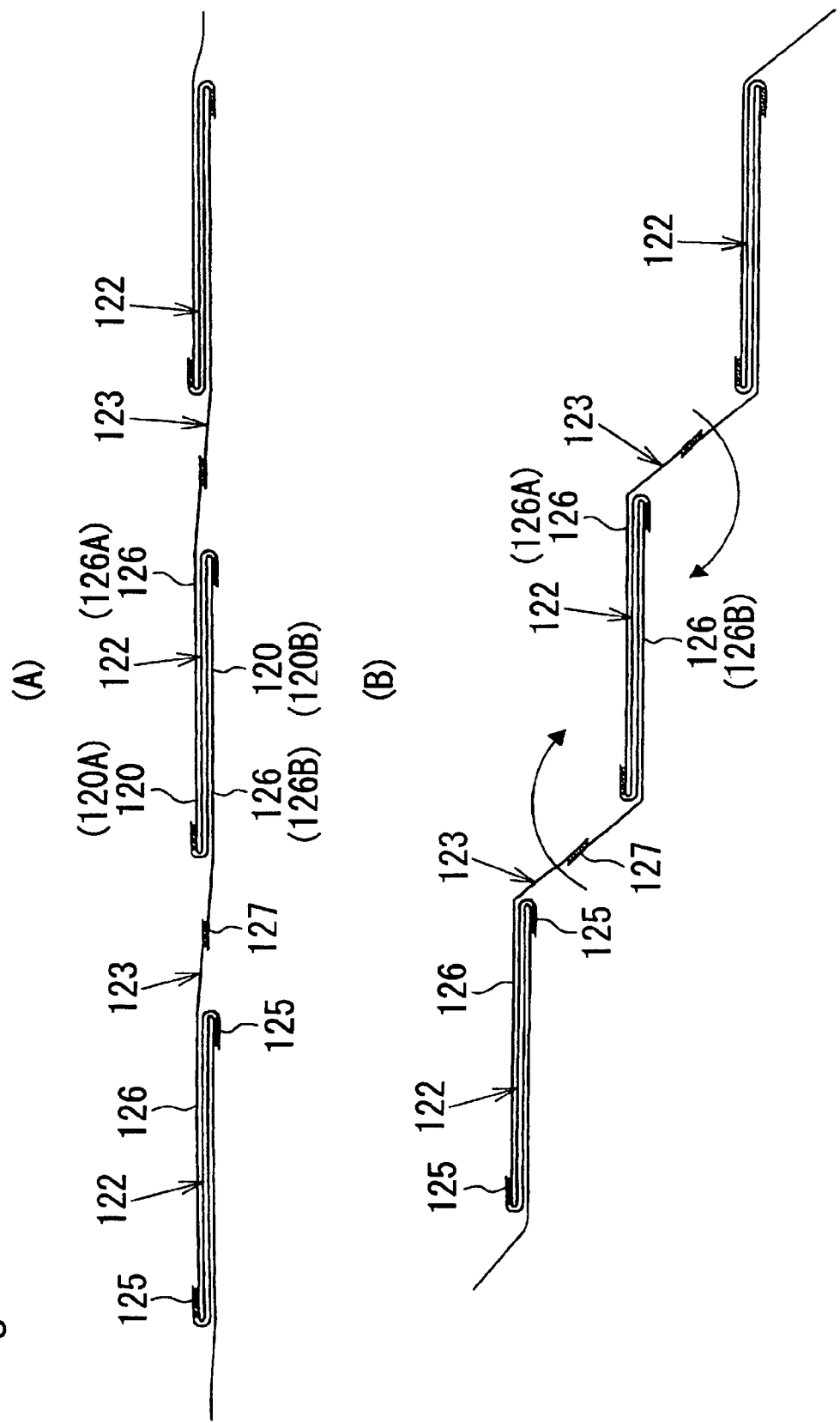
FIG. 30 is a schematic drawing that shows an intermediate stage of a manufacturing process for the continuous assemblage of pots for raising and transplanting seedlings shown in FIG. 28.

Next, a variation of the fourth embodiment of the present invention will be explained based on FIGS. 28 to 30. As shown in FIGS. 28 and 29, in the fourth embodiment, a plurality of square tubular individual pots 122 are grouped, and the individual pots 122 are connected by link pieces 123. A series of continuous pieces 124 is formed by the individual pots 122 and the link pieces 123, the continuous pieces 124 being folded back such that they overlap only by the length of one side face of the individual pot 122 and attached to one another with a water-soluble adhesive between them. Also, each of the continuous pieces 124 is overlapped on the adjacent continuous piece 124 with a water-soluble adhesive between them, such that a continuous assemblage of pots 121 that tightly groups the individual pots 122 is formed by the series of the continuous pieces 124. Note that in FIGS. 28 and 29, the gaps between the individual pots 122 and the link pieces 123, as well as the gaps between the rows of the continuous pieces 124, are shown as open to aid understanding, but actually, a water-soluble adhesive that is not shown in the drawings is interposed in the gaps.

Each of the individual pots 122 is formed by attaching two thin films 120 (120A, 120B) to one another. A non-water-soluble adhesive is used to attach the two thin films 120 to one another at attachment portions 125 in two locations on the left and right that are separated by a specified gap. Inner side portions of the two attachment portions 125 are provided as the individual pot 122. The link pieces 123 are provided on both sides of the individual pot 122 and are formed by using a non-water-soluble adhesive to attach (at attachment portions 127) ends of extension pieces 126 (126A, 126B) of the thin films 120. Of the extension pieces 126, the extension piece 126A on one end is provided on the thin film 120A on one side, and the extension piece 126B on the other end is provided on the thin film 120B on the other side. The extension pieces 126A, 126B are folded back along the side faces of the individual pot 122 in opposite directions and are attached to the side faces of the individual pot 122 using a water-soluble adhesive. The length of each of the extension pieces 126 is set such that the attachment portions 127 are positioned at intermediate locations between the adjacent individual pots 122. Thus, the link piece 123 has a length that is approximately five times the length of one side of the individual pot 122.

Every second continuous pieces 124 is rotated for 180 degrees (inverted) and overlapped on the adjacent continuous piece 124. In this case, at the location where the overlapping portions of the continuous pieces 124 are linked, as shown in FIGS. 28 and 29, a non-water-soluble adhesive at an attachment portion 128 is used to connect a folded-back portion 126a to an extra long portion 126b. The folded-back portion 126a is formed at an end of the extension piece 126 that is attached to the individual pot 122 that is positioned at an end of the continuous piece 124 on the upper side, and the extra long portion 126b is formed at an end of the extension piece 126 that is attached to the individual pot 122 that is positioned at an end of the continuous piece 124 on the lower side.

The continuous assemblage of pots 121 that is structured in this way is provided and stored in a flattened state, as shown in FIG. 29. Starting from the flattened state, the continuous pieces 124 are pulled open in the layering direction, expanding into a plurality of the individual pots 122 in a grid pattern, as shown in FIG. 28, and forming the continuous assemblage of pots 121 of a specified size. The point about the continuous assemblage of pots 121, in the expanded state, being set into a cultivation box (not shown in the drawings) is the same as in the fourth embodiment, and the water-soluble adhesive between the extension pieces 126 of the thin films 120 and the side faces of the individual pots 122 and the water-soluble adhesive between the continuous pieces 124 become degraded by the watering during the raising of the seedlings. Therefore, during transplanting after the seedlings are raised, when one end of the continuous pieces 124 that make up the continuous assemblage of pots 121 is pulled, the continuous pieces 124 are pulled out in sequence, such that efficient planting is possible. In this case, the length of the link piece 123 becomes approximately five times the length of one side of the individual pot 122, so the continuous assemblage of pots 121 can effectively handle the cultivation of a crop that requires a wide interval between the planted seedlings.

Note that in the fourth and fifth embodiments, it is desirable to form perforations in the individual pots 82, 122, and 112, which are formed by expanding the continuous assemblages of pots 81 and 121, at positions that correspond to the lines where adjacent sides of each hexagonal and square tubular pot meet. As shown in FIG. 24, a perforation processing unit (not shown in the drawing) may be positioned immediately after the linking rollers 103, and the perforations may be formed in the individual pots 82, 122, and the individual pots 112.

Also, the materials for the thin films that are used in the continuous assemblages of pots 81 and 121, and the types of adhesives that are used, may be freely selected in the same manner that is described for the first and second embodiments.

A method of manufacturing the continuous assemblage of pots 121 is basically the same as in the case of the fourth embodiment. After the individual pots 122, which have the extension pieces 126 of the thin films 120 on both sides, are formed, the extension pieces 126 are folded back along the side faces of the individual pots 122, as shown in FIG. 30(A), and the extension pieces 126 are attached by the water-soluble adhesive to the side faces of the individual pots 122. The link pieces 123 are formed by using the water-soluble adhesive to attach the ends of the extension pieces 126 to one another at the attachment portions 127. Next, the continuous piece 124 is formed by arranging the individual pots 122 in a row, then folding back each link piece 123 along the side face of the individual pot 122, as shown in FIG. 30(B), such that the individual pots 122 overlap by the length of one side face, then attaching the link pieces 123 to the side faces of the individual pots 122 with the water-soluble adhesive. Next, every second continuous pieces 124 is rotated for 180 degrees and overlapped on the adjacent continuous piece 124. The continuous pieces 124 are then layered and attached to one another with the water-soluble adhesive.

What is claimed is:

1. A continuous assemblage of pots for raising and transplanting seedlings in which hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive therebetween, wherein:
   each of the link pieces is formed by folding back one end of a strip-shaped thin film in the length direction, such that approximately one-third of the length of the thin film is folded back, then attaching the folded-back portion to the thin film with a water-soluble adhesive;
   the link pieces are disposed in a staggered arrangement in which the folded-back portions are oriented such that they face the folded-back portions of the opposing link pieces;
   the continuous pieces are formed by using a non-water-soluble adhesive to attach both ends in the length direction of each link piece to the opposing link pieces; and
   the individual pots are formed between the opposing link pieces.

2. A method of manufacturing the continuous assemblage of pots for raising and transplanting seedlings according to claim 1, comprising:
   a first process that applies the water-soluble adhesive to one face of the strip-shaped thin film and forms the link piece by folding back one end of the strip-shaped thin film in the length direction, such that approximately one-third of the length of the thin film is folded back, then attaching the folded-back portion to the thin film;
   a second process that disposes the link pieces in the staggered arrangement, in which the folded-back portions are oriented such that they face the folded-back portions of the opposing link pieces, and forms the continuous pieces and the individual pots by using the non-water-soluble adhesive to attach both ends in the length direction of each link piece to the opposing link pieces; and
   a third process that overlaps the continuous pieces and attaches them to one another with a water-soluble adhesive.

3. A continuous assemblage of pots for raising and transplanting seedlings in which at least one of square and hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive therebetween, wherein:
   the link pieces and the individual pots are independently formed from strip-shaped thin films;
   the link pieces are disposed in a staggered arrangement in alternation with and on both sides of the individual pots, which are arranged in a row;
   both ends of each link piece are attached to side faces of the adjacent individual pots with a non-water-soluble adhesive; and
   one side of each link piece is attached to the corresponding side face of the individual pot with a water-soluble adhesive.

4. The continuous assemblage of pots for raising and transplanting seedlings according to claim 2, wherein:
   the individual pots have a hexagonal tubular shape; and
   the link pieces have a length that is from one to seven times (but not the same as) the length of one side face of the individual pots.

5. The continuous assemblage of pots for raising and transplanting seedlings according to claim 3, wherein:
- the individual pots have a square tubular shape; and
- the link pieces have a length that is from one to five times (but not the same as) the length of one side face of the individual pots.

6. A method of manufacturing the continuous assemblage of pots for raising and transplanting seedlings according to claim 3, comprising:
- a first process that attaches both ends of the strip-shaped thin film by a non-water-soluble adhesive to form the tubular individual pots;
- a second process that disposes the link pieces in the staggered arrangement in alternation with and on both sides of a specified number of the individual pots, which are arranged in a row, attaches both ends of each link piece to the corresponding side faces of the adjacent individual pots with a non-water-soluble adhesive, and forms the continuous piece by attaching one side of each link piece to the side face of the individual pot with a water-soluble adhesive; and
- a third process that overlaps the continuous pieces and attaches them to one another with a water-soluble adhesive.

7. A continuous assemblage of pots for raising and transplanting seedlings in which at least one of square and hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive therebetween, wherein:
- the individual pots are formed by attaching two thin films;
- extension pieces of the thin films, which are provided on both sides of the individual pots, are folded back along side faces of the individual pots and are attached to the side faces using a water-soluble adhesive;
- the link pieces are formed by using a non-water-soluble adhesive to attach ends of the extension pieces to one another between the adjacent individual pots.

8. A method of manufacturing the continuous assemblage of pots for raising and transplanting seedlings according to claim 7, comprising:
- a first process that attaches the two strip-shaped thin films by a non-water-soluble adhesive and forms the individual pots, which have the extension pieces on both sides;
- a second process that folds back the extension pieces along the side faces of the individual pots and attaches the extension pieces to the side faces of the individual pots using the water-soluble adhesive;
- a third process that produces the continuous pieces by disposing the individual pots in a row, then forming the link pieces by using the non-water-soluble adhesive to attach the ends of the extension pieces to one another between the adjacent individual pots; and
- a fourth process that overlaps the continuous pieces and attaches them to one another with a water-soluble adhesive.

9. A continuous assemblage of pots for raising and transplanting seedlings in which at least one of square and hexagonal tubular individual pots that are formed by expanding papers or paper-like thin films are connected by link pieces to form continuous pieces, the continuous pieces are overlapped on one another, and the overlapping continuous pieces are attached to one another with a water-soluble adhesive therebetween, wherein:
- the individual pots are formed by attaching two thin films;
- extension pieces of the thin films, which are provided on both sides of half of the individual pots, are folded back along side faces of the individual pots and are attached to the side faces using a water-soluble adhesive;
- the link pieces are formed by using a non-water-soluble adhesive to attach ends of the extension pieces to the individual pots that do not have the extension pieces and that are arranged adjacent to the individual pots.

10. A method of manufacturing the continuous assemblage of pots for raising and transplanting seedlings according to claim 9, comprising:
- a first process that attaches the two strip-shaped thin films by a non-water-soluble adhesive and forms the first individual pots, which have the extension pieces on both sides, the second individual pots, which do not have the extension pieces on both sides;
- a second process that folds back the extension pieces along the side faces of the first individual pots and attaches the extension pieces to the side faces of the first individual pots using the water-soluble adhesive;
- a third process that produces the continuous pieces by disposing the first individual pots and the second individual pots in a row, then forming the link pieces by attaching the ends of the extension pieces on the first individual pots to the second individual pots; and
- a fourth process that overlaps the continuous pieces and attaches them to one another with a water-soluble adhesive.

* * * * *